Figure 1:
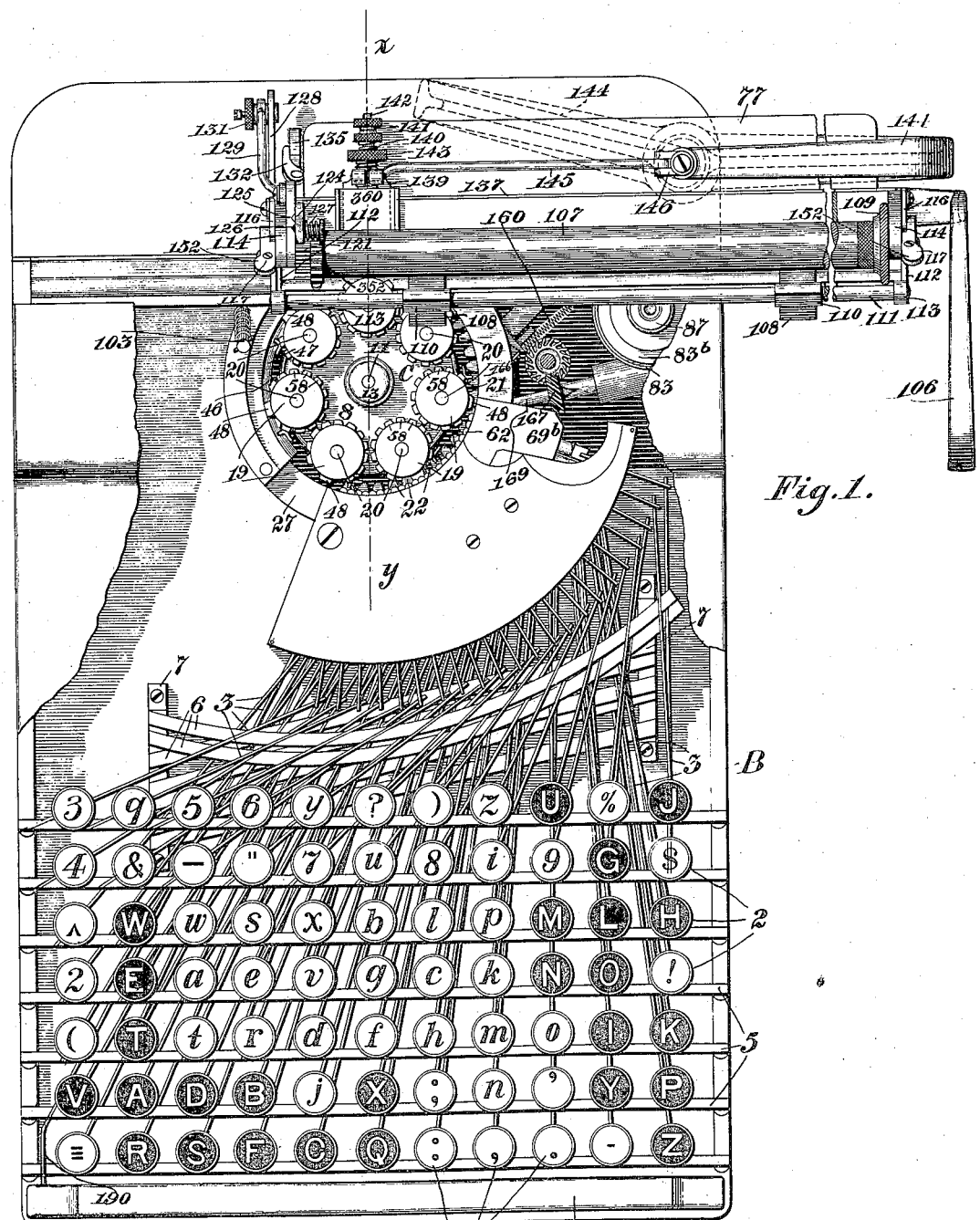

No. 852,905. PATENTED MAY 7, 1907.
F. H. RICHARDS.
TYPOGRAPHIC MACHINE.
APPLICATION FILED DEC. 29, 1900.

16 SHEETS—SHEET 1.

Witnesses
A. B. Mattingly
F. W. Haviland

Inventor
F. H. Richards

No. 852,905. PATENTED MAY 7, 1907.
F. H. RICHARDS.
TYPOGRAPHIC MACHINE.
APPLICATION FILED DEC. 29, 1900.

16 SHEETS—SHEET 3.

Witnesses
A. B. Mattingly
F. N. Haviland

Inventor.
F. H. Richards.

No. 852,905. PATENTED MAY 7, 1907.
F. H. RICHARDS.
TYPOGRAPHIC MACHINE.
APPLICATION FILED DEC. 29, 1900.
16 SHEETS—SHEET 4.
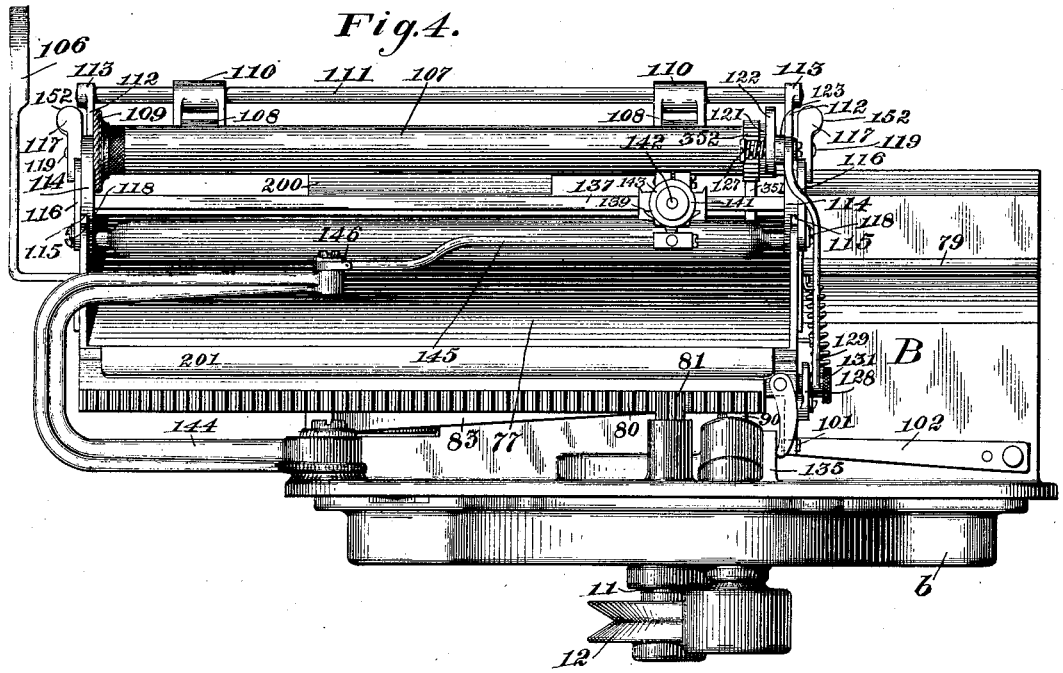
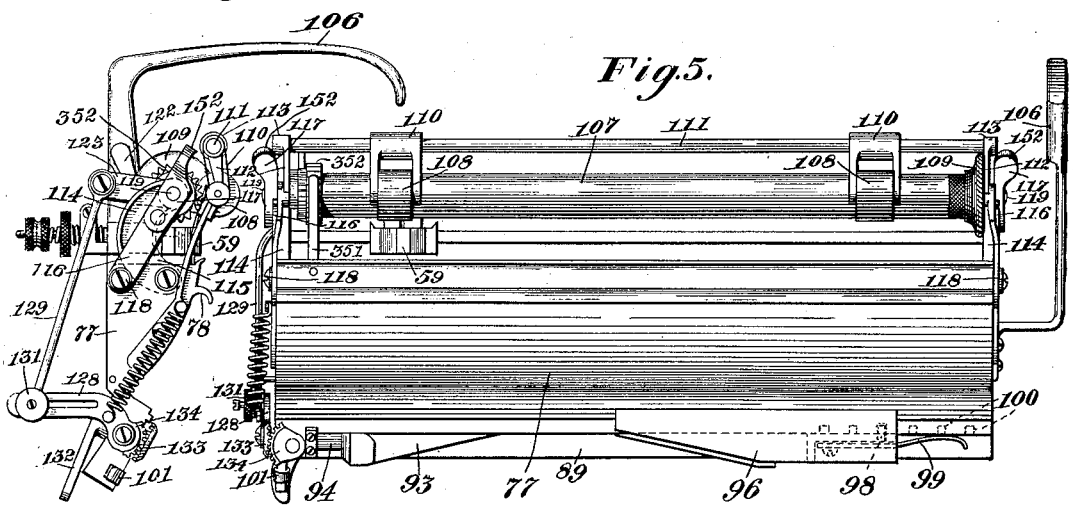
Witnesses
A. B. Mattingly
F. N. Haviland
Inventor.
F. H. Richards.

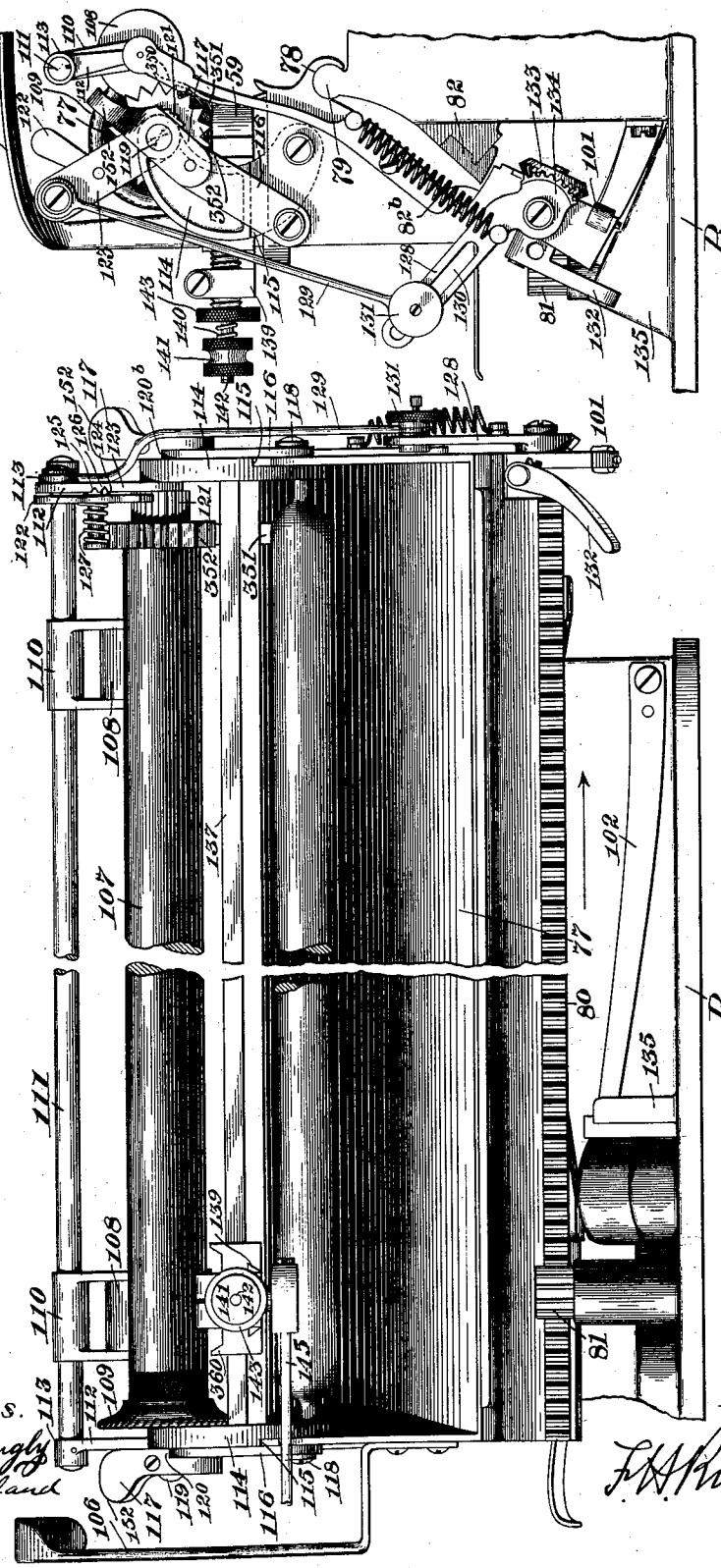

No. 852,905. PATENTED MAY 7, 1907.
F. H. RICHARDS.
TYPOGRAPHIC MACHINE.
APPLICATION FILED DEC. 29, 1900.

16 SHEETS—SHEET 6.

Witnesses.
A. B. Mattingly
F. N. Navland

Inventor
F. H. Richards.

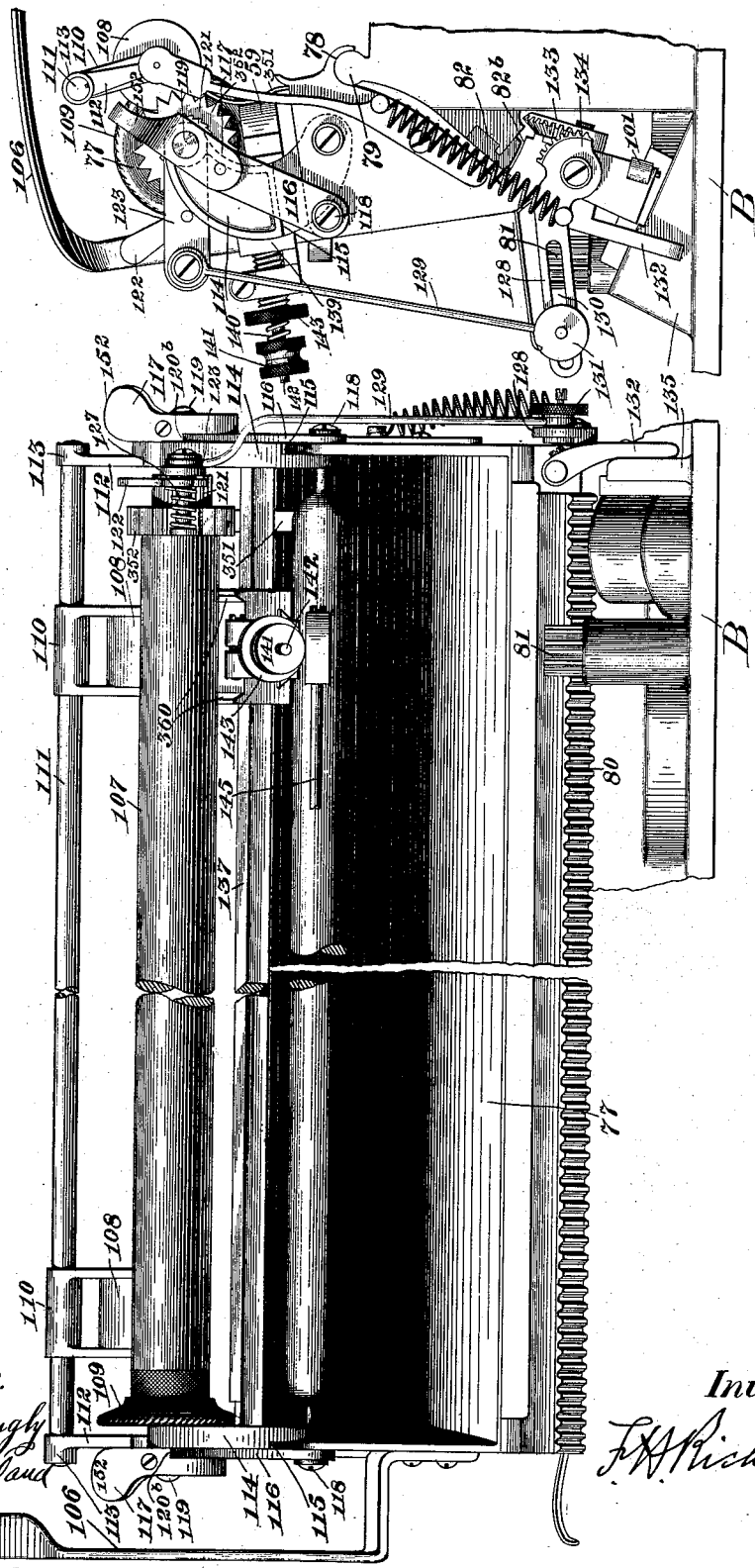

No. 852,905. PATENTED MAY 7, 1907.
F. H. RICHARDS.
TYPOGRAPHIC MACHINE.
APPLICATION FILED DEC. 29, 1900.

16 SHEETS—SHEET 8.

Witnesses:
A. B. Mattingly
H. W. Harland

Inventor:
F. H. Richards

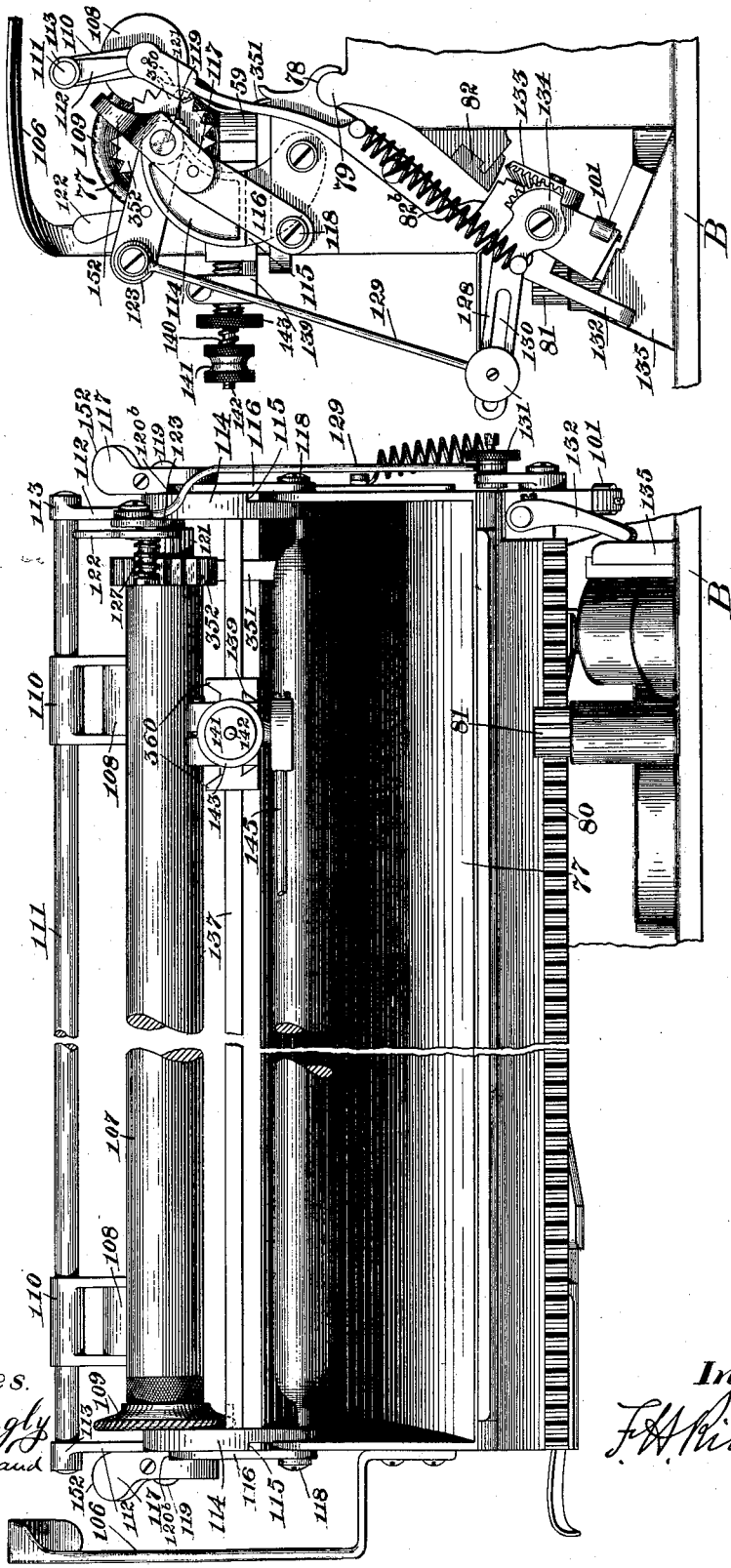

No. 852,905. PATENTED MAY 7, 1907.
F. H. RICHARDS.
TYPOGRAPHIC MACHINE.
APPLICATION FILED DEC. 29, 1900.
16 SHEETS—SHEET 10.
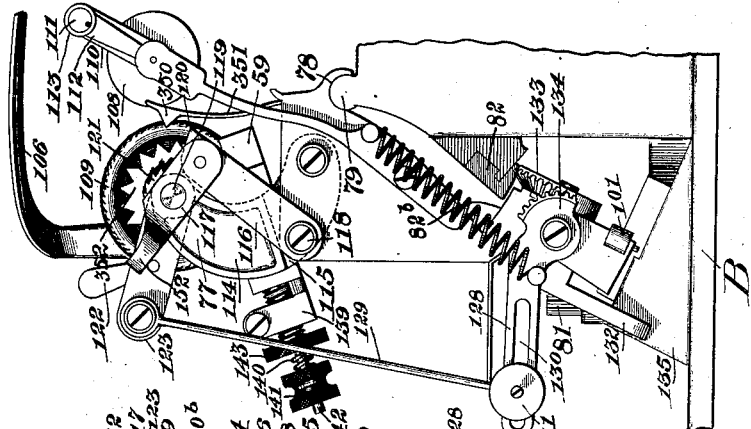
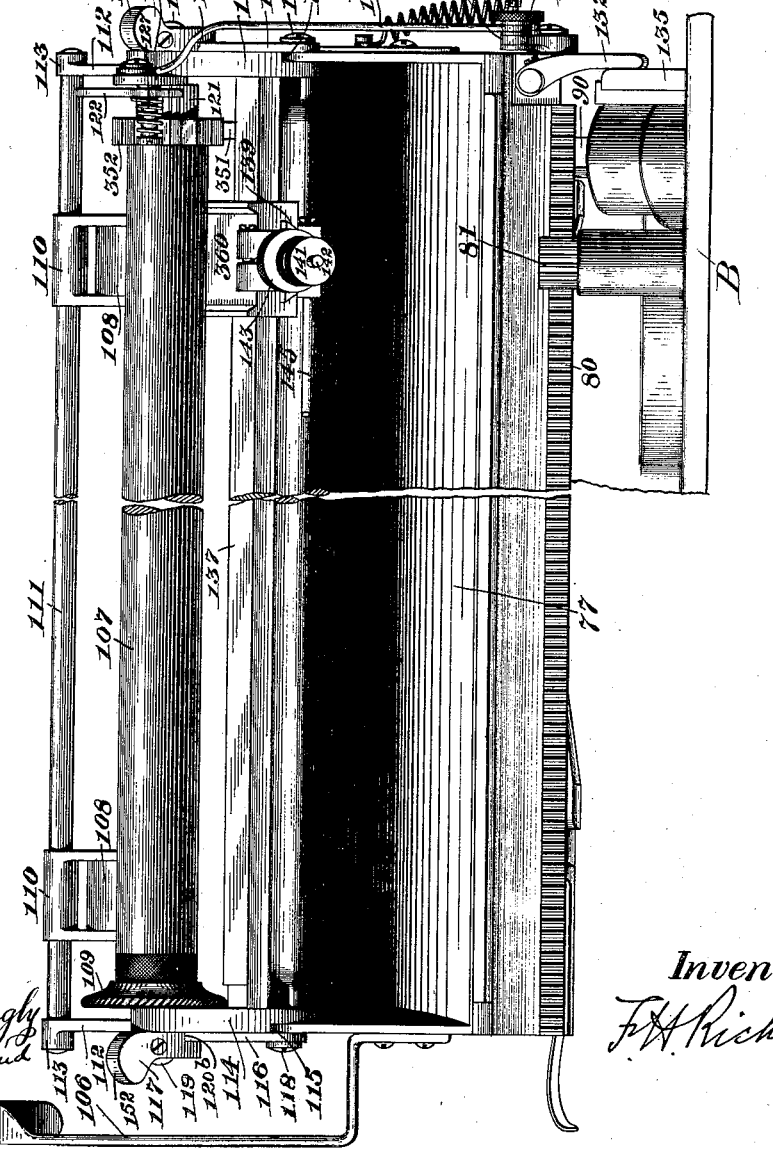
Witnesses.
Inventor.

No. 852,905.  
F. H. RICHARDS.  
TYPOGRAPHIC MACHINE.  
APPLICATION FILED DEC. 29, 1900.
PATENTED MAY 7, 1907.
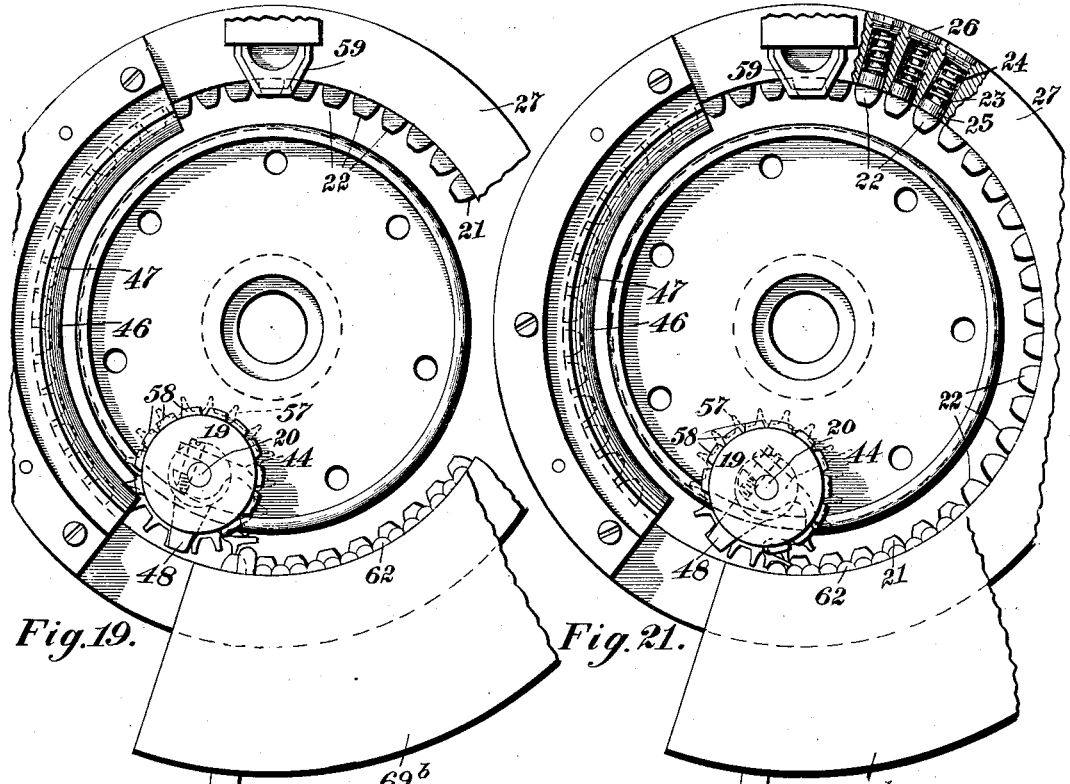
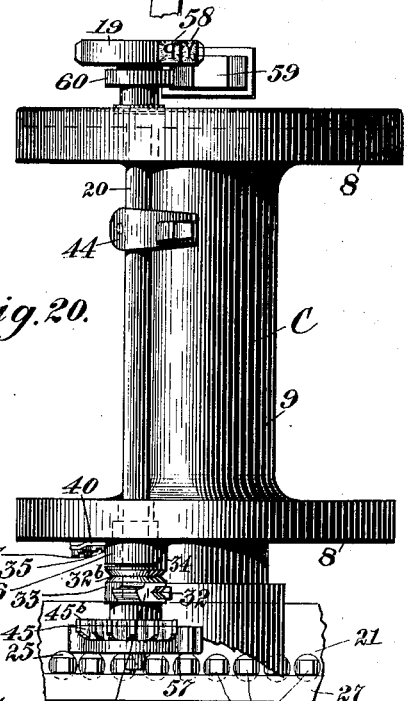
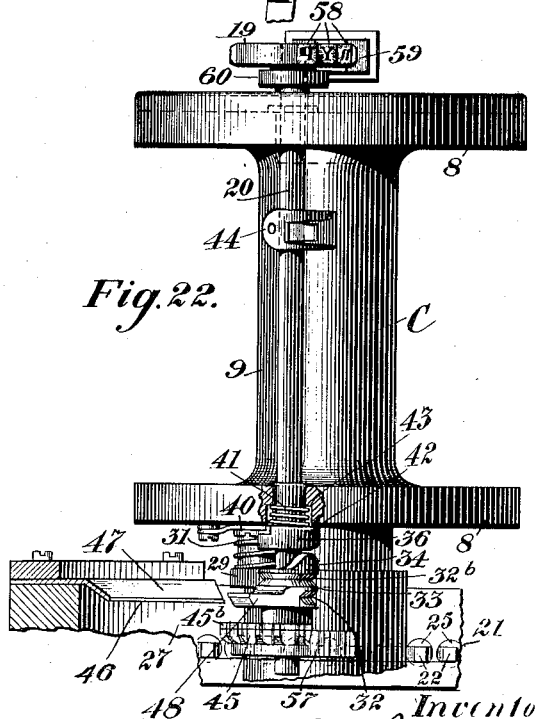

No. 852,905. PATENTED MAY 7, 1907.
F. H. RICHARDS.
TYPOGRAPHIC MACHINE.
APPLICATION FILED DEC. 29, 1900.

16 SHEETS—SHEET 12.

Witnesses.
A. B. Mattingly
F. N. Harland

Inventor.
F. H. Richards.

No. 852,905. PATENTED MAY 7, 1907.
F. H. RICHARDS.
TYPOGRAPHIC MACHINE.
APPLICATION FILED DEC. 29, 1900.

16 SHEETS—SHEET 13.

Witnesses.
Inventor.

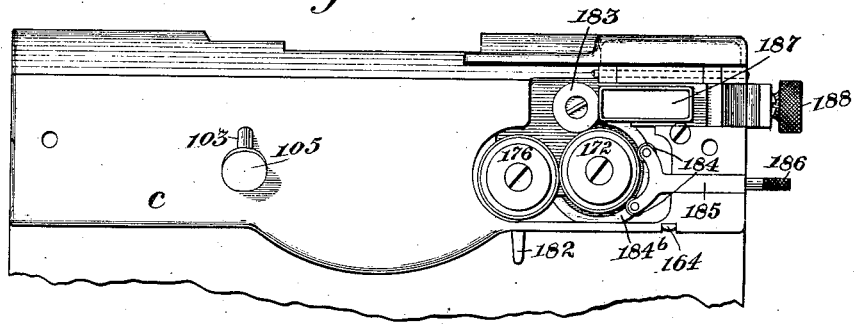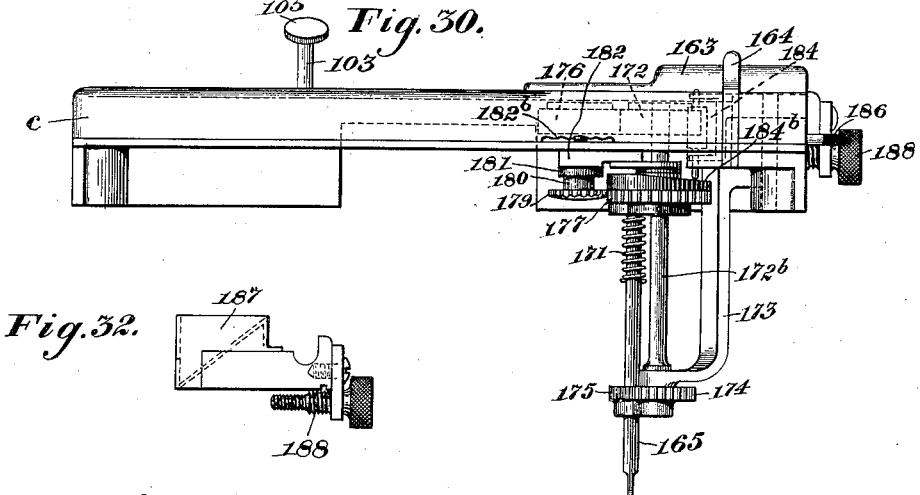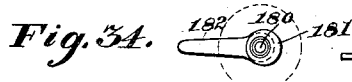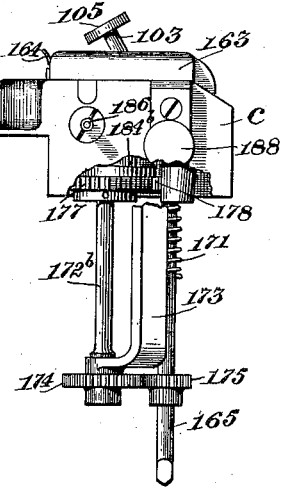

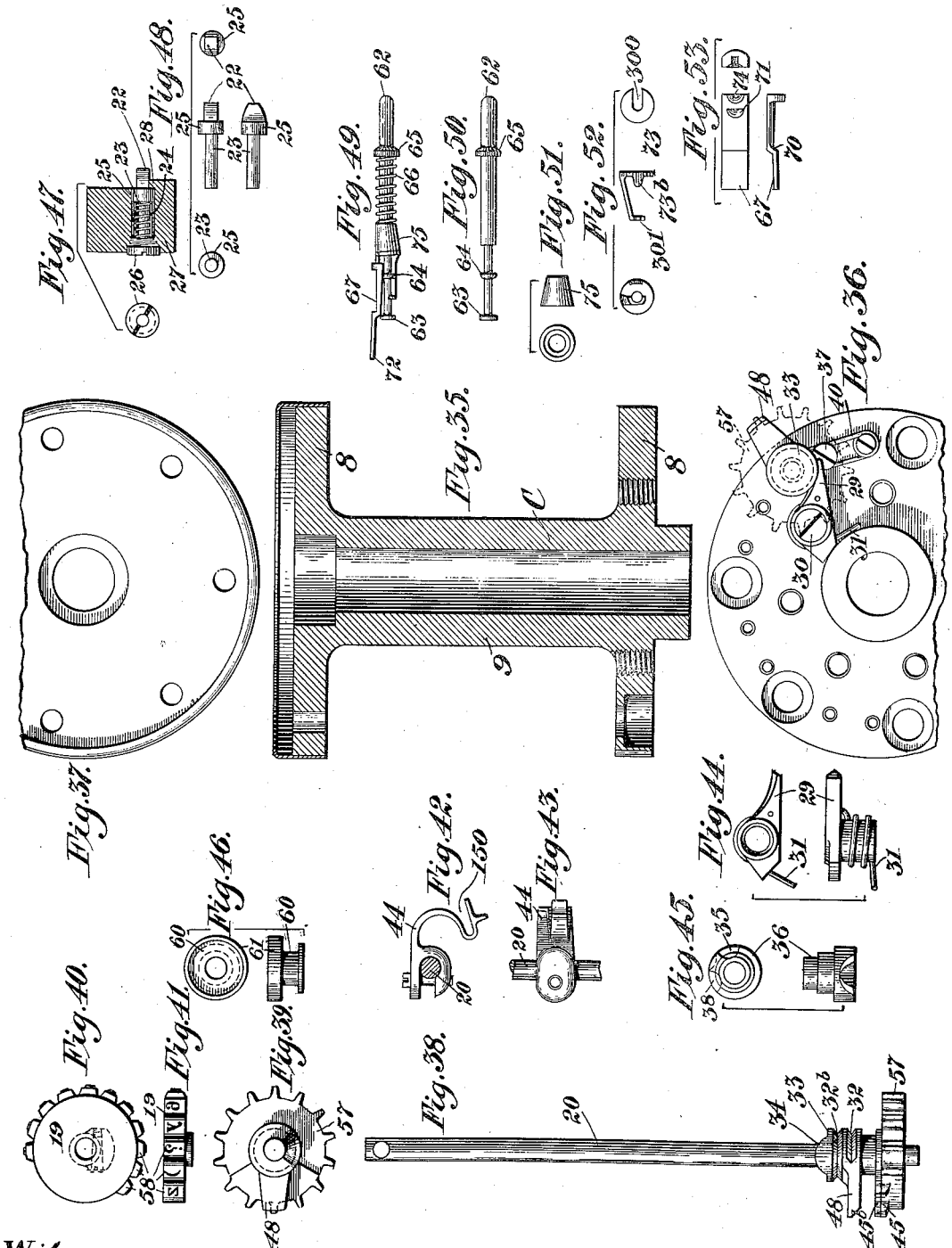

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

TYPOGRAPHIC MACHINE.

No. 852,905.     Specification of Letters Patent.     Patented May 7, 1907.

Application filed December 29, 1900. Serial No. 41,521.

*To all whom it may concern:*

Be it known that I, FRANCIS H. RICHARDS, a citizen of the United States, residing at Hartford, in the county of Hartford and State of Connecticut, have invented certain new and useful Improvements in Typographic Machines, of which the following is a specification.

This invention relates to typographic machines, and has for an object to furnish a machine adapted for use as a typewriting-machine.

The invention embraces also a power-driven machine, and has for an object to furnish a mechanism whose several functions in their performance are caused to operate directly or indirectly by power from a suitable source.

It is an object furthermore of the invention to provide means whereby the actual performance of these various functions are under the immediate control of an operator manipulating the machine.

The various features of the invention will now be described with the aid of the accompanying drawings which form a part of this specification and show an embodiment of the invention.

Figure 2:
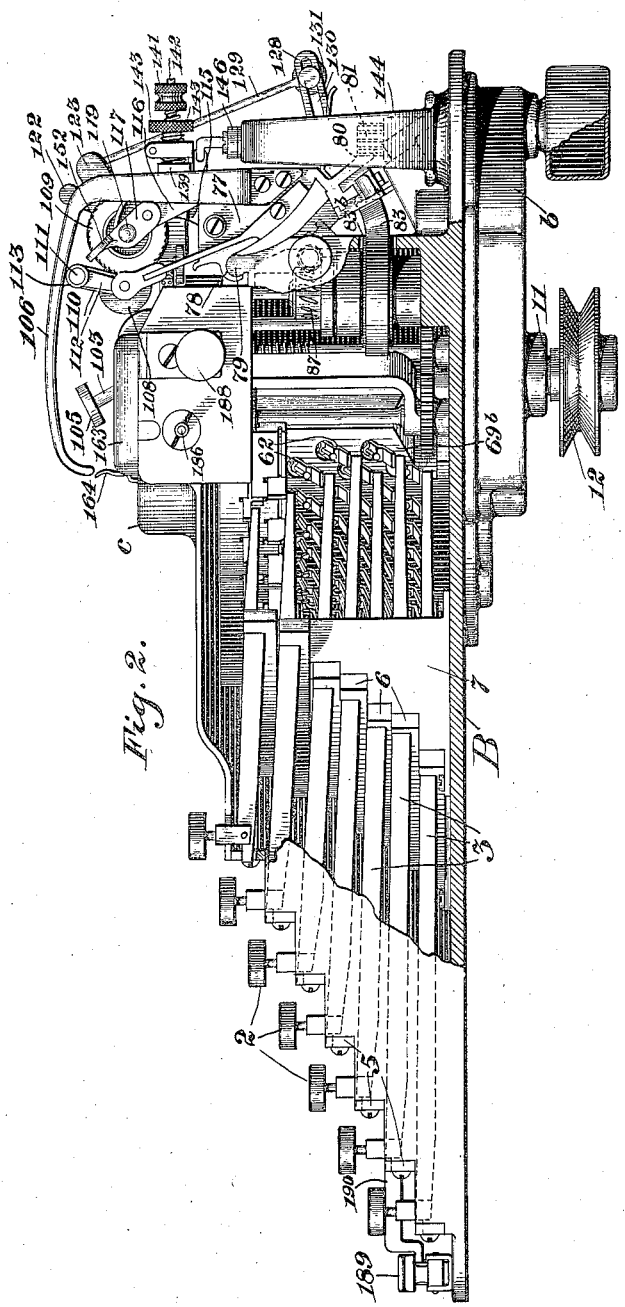
Figure 3:
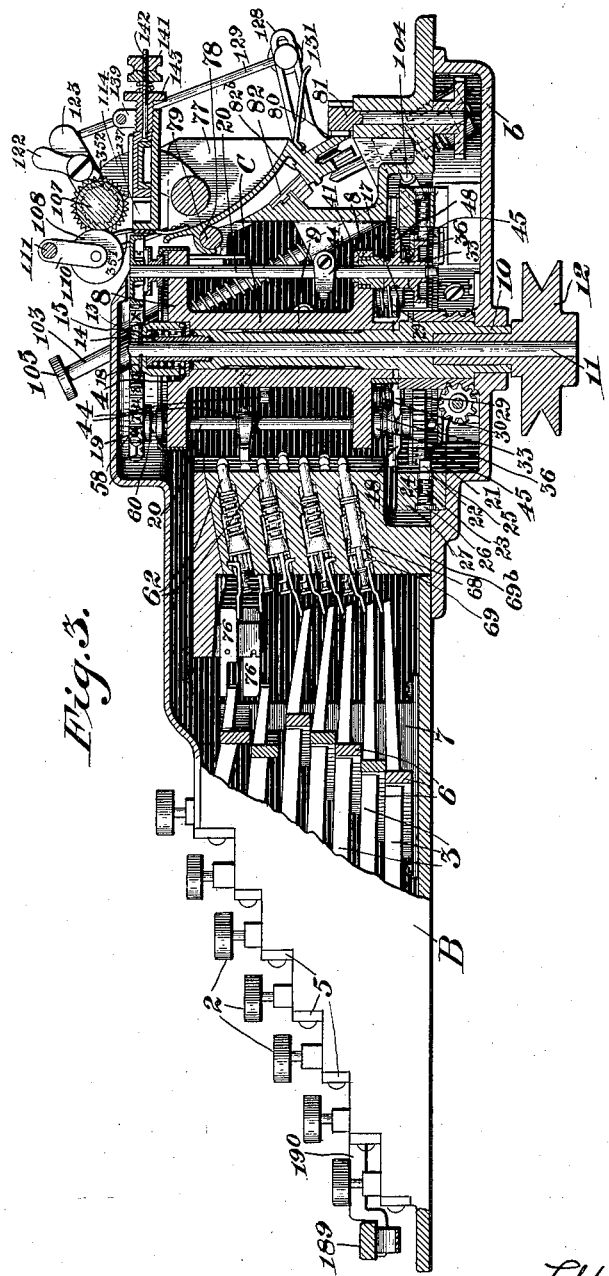
Figure 10:
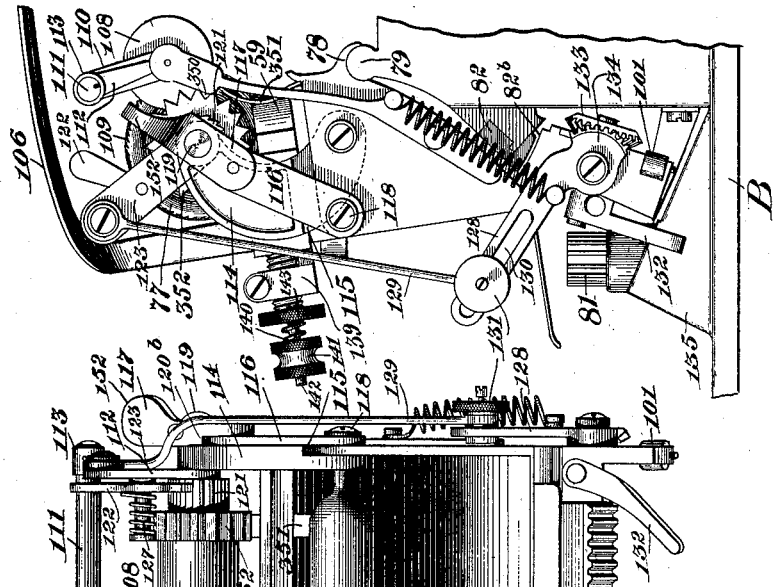
Figure 9:
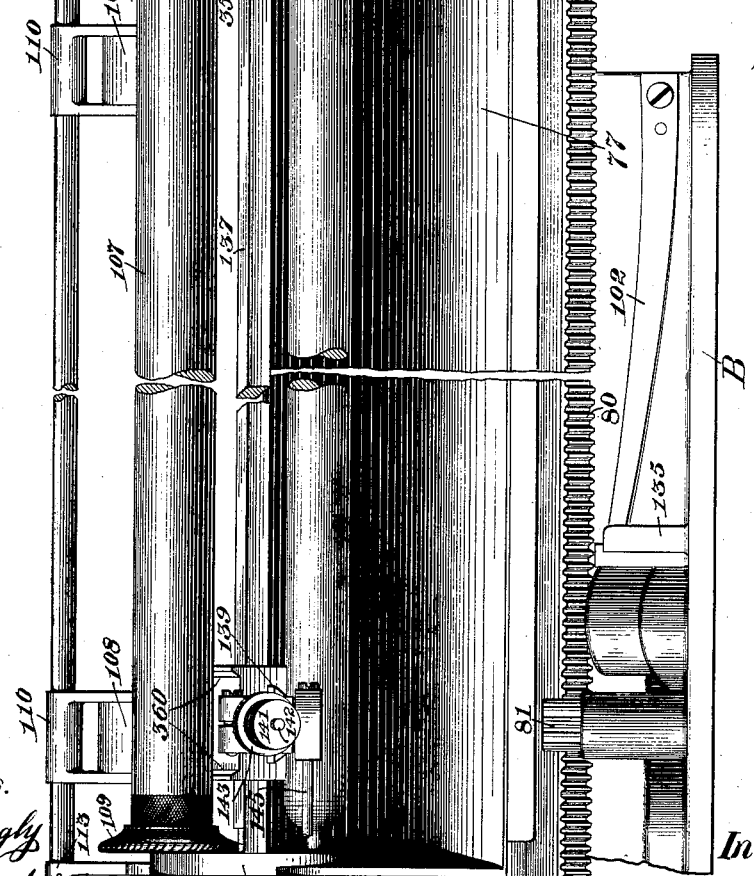
Figure 14:
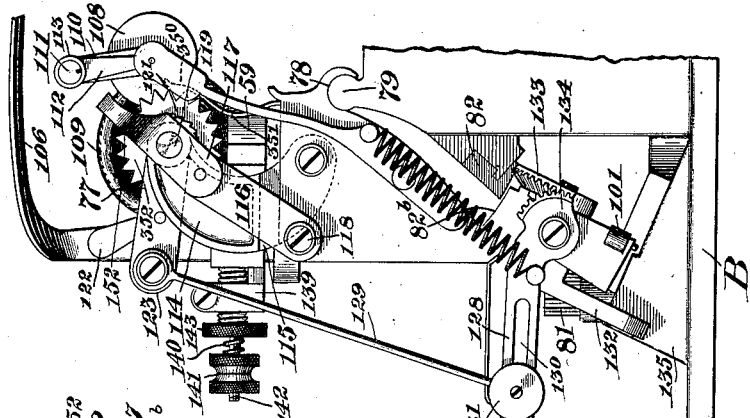
Figure 13:
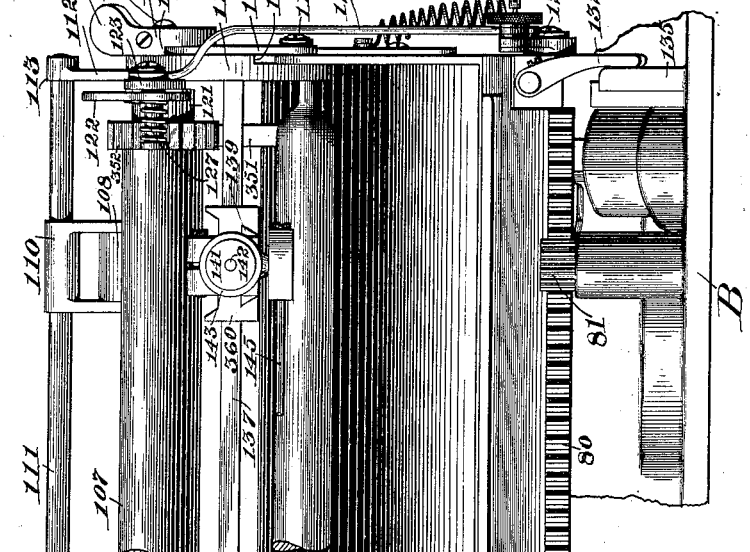
Figure 23:
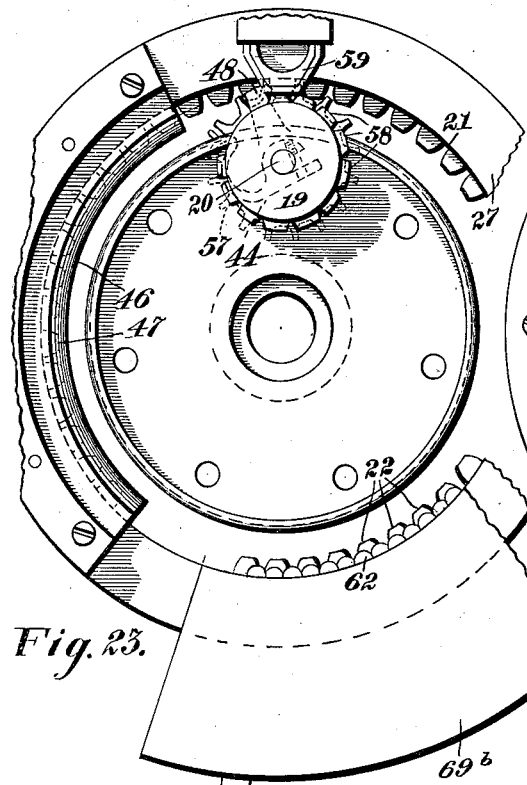
Figure 25:
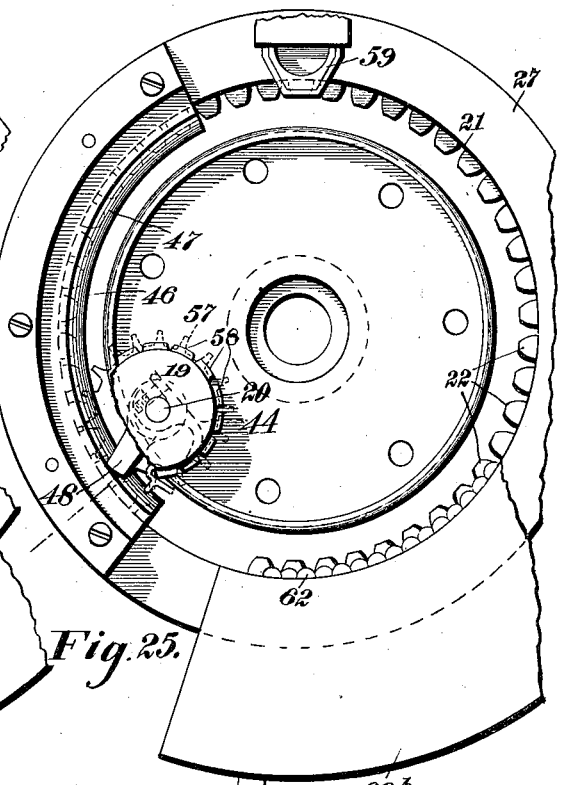
Figure 24:
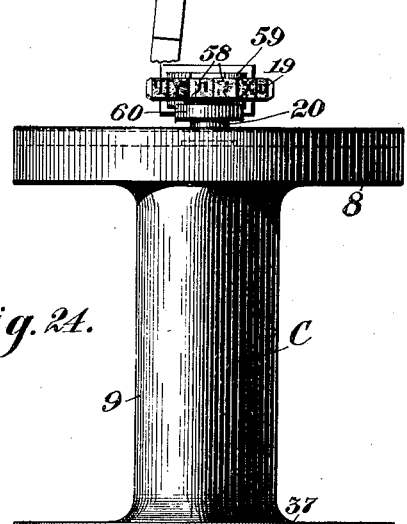
Figure 26:
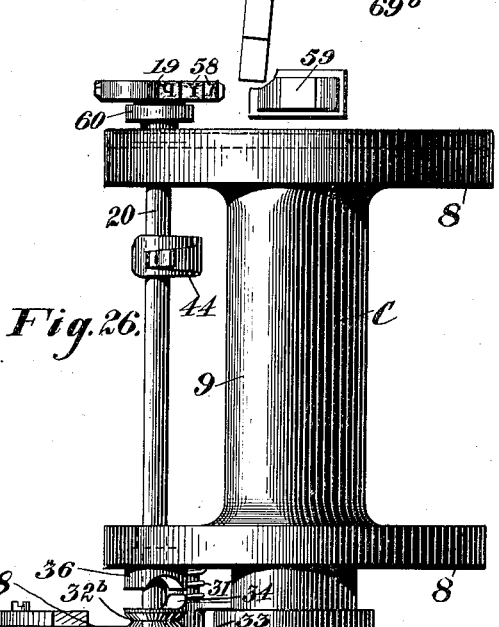
Figure 28:
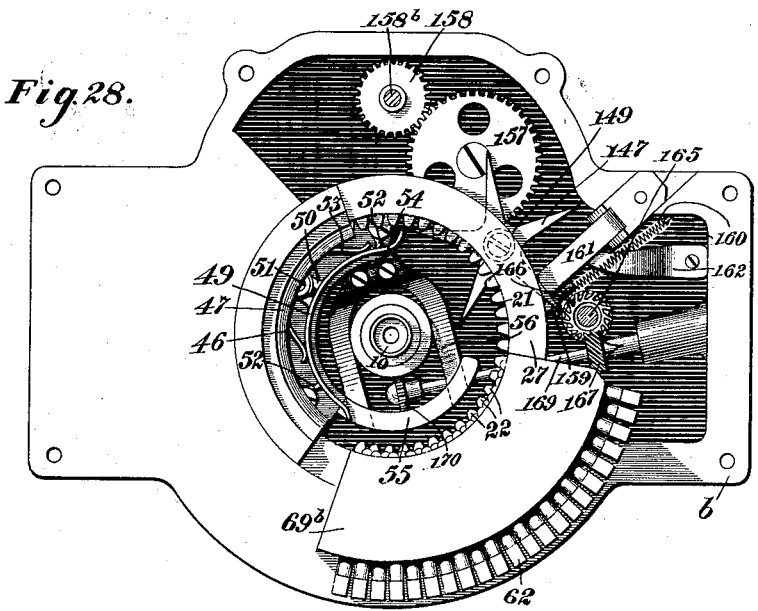
Figure 27:
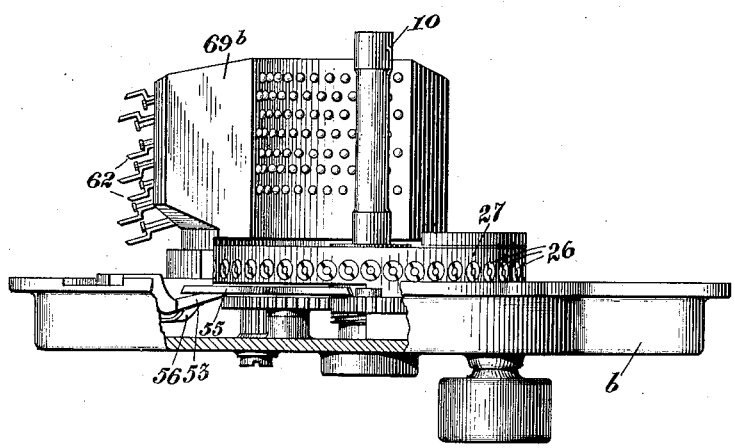
Figure 54:
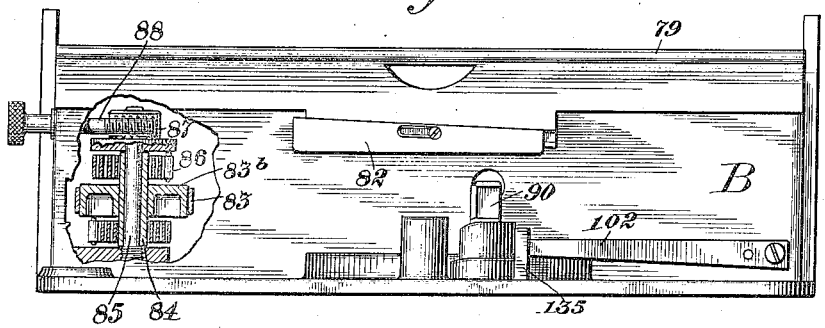
Figure 55:
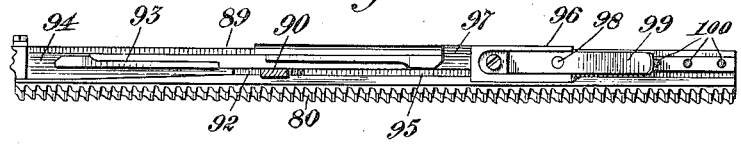

In these drawings Figure 1 is a plan view of a typewriting-machine embodying my present invention and shows a plan of the key-board thereof, certain parts being broken away the better to show underlying parts. Fig. 2 is a side elevation of the machine, a portion of the inclosing framework or casing being removed to show parts lying beyond. Fig 3 is a central, longitudinal section of the machine taken on the plane of the line *x—y* in Fig. 1, a part, however, in this view being shown in elevation. Fig. 4 is an elevation of the machine looking from the back toward the front thereof. Fig. 5 is an elevation of a traveling carriage embodied in the machine and various associated and co-operating parts, the same being removed from their normal positions and being represented as they appear when seen from the front of the machine. Fig. 6 is an end view of such carriage and parts as seen from the left of Fig. 5; Fig. 7 represents the traveling carriage and various associated and co-operating parts forming the traversing mechanism as seen from the rear of the machine when the carriage has about completed its movement from left to right in the direction of the arrow; a portion adjacent to the middle is in this figure omitted, and the scale of the figure and all succeeding ones is somewhat larger than the scale of the preceding views. Fig. 8 is an end view of the carriage and parts as shown in Fig. 7, the point of view being taken at the right of Fig. 7. Fig. 9 is a rear view similar to Fig. 7 and exhibits the relation of the carriage and the parts when the carriage has completed its movement from left to right as indicated by the arrow, and shows the pinion for traversing the carriage as being disengaged from its rack on the latter. Fig. 10 is a view similar to Fig. 8 and shows the carriage and the parts as seen from the right of Fig. 9. Fig. 11 is a view similar to Fig. 7, showing the carriage and various associated and co-operating parts in a position adjacent to the extreme position of the carriage toward the left and just after certain features have been actuated to turn a feed-roll upon its axis. Fig. 12 is an end view similar to Fig. 8, looking from the right of Fig. 11. Fig. 13 is a view similar to Fig. 7, showing the position of the carriage and the parts immediately after this feeding action has taken place, and the pinion for traveling the carriage has engaged with its rack on the latter. Fig. 14 is an end view as seen from the right hand of Fig. 13. Fig. 15 is a view similar to Fig. 7, showing the position assumed by the carriage and the parts when the pinion for traversing the carriage in one direction has moved the carriage a little distance in the direction of the arrow, this action occurring simultaneously with and permitting the return of the feed-roll actuating mechanism to its normal position. Fig. 16 is an end view similar to Fig. 8 as seen from the right hand in Fig. 15. Figs. 17 and 18 are views similar, respectively, to Figs. 13 and 14, but represent the feed-roll and certain pressure rolls embodied in the machine separated from each other, the feed-roll being swung back toward the rear of the machine. Fig. 19 is a top view of a rotating carrier or turret embraced in the machine, showing the same in a position immediately preceding the throwing into operative movement of a part mounted upon the turret; portions in this figure are broken away. Fig. 20 is an elevation of the carrier or turret shown in Fig. 19, certain features shown in the latter figure being omitted, and certain other co-operating features being shown. Fig. 21 is a view similar to Fig. 19, the part carried by the turret being here shown in a position in which the operative movement thereof has been commenced. Fig. 22 is an elevational view similar to Fig. 20 of the turret, the part carried thereby being represented in the position shown in Fig. 21, and certain portions not shown in Fig. 20 being included. Fig. 23 is a plan or top view as before, but shows the said part in the act of operating at a determined point upon the surface of an object placed there for the purpose. Fig. 24 is an elevation similar to Figs. 20 and 22 of the turret and supported part and certain co-operating features. Fig. 25 is still another top or plan view illustrating the said part at one step in its progress from a condition of operative to inoperative movement. Fig. 26 is an elevation as before of the turret and the part as shown in Fig. 25, certain other associated features being shown. Fig. 27 is an elevation showing part of the means for throwing into operative movement one or more rotating parts mounted upon the turret; the shaft or stud determining the axis of rotation of the latter and the axis of revolution of the parts is also shown in this figure as various other features. Fig. 28 is a plan view of the mechanism shown in Fig. 27. Fig. 29 is a top view of an appurtenance of the framework located at the top or upper side thereof and toward the rear of the machine, and in which is located certain inking mechanism; a cover or lid normally extending over an opening in this appurtenance is shown as being thrown back to exhibit certain features of the mechanism. Fig. 30 is a front elevation of the appurtenance and mechanism shown in Fig. 29, the cover in this view, however, being shown as closed. Fig. 31 is a side view of the appurtenance and mechanism shown in Fig. 30. Fig. 32 is a detail view of an ink box, illustrating means for adjusting the position of the same. Figs. 33 and 34 are elevational and bottom views, respectively, of a device for adjusting the position of an ink-distributing roller toward and away from the printing type. Fig. 35 is a central, longitudinal section showing the carrier or turret set forth in the preceding figures. Fig. 36 is a view looking at the lower end thereof, certain details being shown in this figure which are not shown in Fig. 35, and certain portions being broken away. Fig. 37 is a top view of the carrier or turret, a part of this figure also being broken away. Fig. 38 is a view of a rotating shaft and gear wheel which are mounted to turn upon the carrier or turret; this view also shows certain other details. Fig. 39 is a plan view of the features set forth in Fig. 38. Fig. 40 is a plan view of a part constituting an impression device or impressor, and which operates in unison with the said rotating shaft. Fig. 41 is an edge view of said part. Fig. 42 is a plan of a starting-arm, the movement of which initiates the movement of said rotating shaft. Fig. 43 is another view thereof. Fig. 44 shows views of a device for conveniently positioning and holding the said rotating shaft in the extreme positions of its longitudinal or endwise movement. Figs. 45 and 46 represent various views of details. Fig. 47 shows views of a tooth or cog of a driver exhibiting a method of mounting the same. Fig. 48 shows various views of this tooth or cog removed from its position when in place. Fig. 49 is a view of a latch mechanism. Fig. 50 is a view of a reciprocating latch or bolt of the latch mechanism stripped of some of its details. Figs. 51, 52, and 53 are various views showing details of the latch mechanism. Fig. 54 is a view looking at the rear of the casing or framework of the machine, the carriage normally thereon being removed; and Fig. 55 is a plan looking at the bottom of the carriage and shows certain cam faces thereon.

Similar characters of reference designate corresponding parts in all the figures.

The various mechanisms, details of construction, and combination of parts involved in the present improvements are susceptible of separate and conjoint or collective application, and for the sake of illustrating a concrete embodiment of the invention they are represented and described as adapted to conjoint use in a typewriting-machine. It is, however, to be understood that in so illustrating and describing the invention such a particular application is not to be construed as marking out and defining the limits of the invention, which is applicable, generally, to typographic machines. A machine of the particular character stated is chosen for illustrative purposes by reason of the fact that the various features embraced in the invention are especially adapted to use and operation therein. The particular class of typewriting-machines chosen for exhibiting an embodiment of the invention is that in which one or more rolling impressors or type wheels are brought in proper position for effecting an impression by the mechanisms of the machine under the control of the operator. The present embodiment, furthermore, is in a machine in which the various functional operations are performed more or less directly by an extraneous force applied to the machine, the work of the operator being merely to control the bringing into activity of these various functional mechanisms. Having premised these general statements respecting the nature of the present embodiment, a description of the improvements involved in this my present invention as well as their particular application to the aforementioned typewriting-machine, will be forthwith entered upon.

Fig. 1 shows a plan of the key-board of such a machine comprising the usual series of keys or marked finger pieces 2 affixed to the outer ends of levers 3. A number of rows of such finger pieces are shown extending across the machine from right to left, the several rows being arranged at an increasing distance from the front toward the rear of the machine as shown in Figs. 1, 2, and 3. The operative or force transmitting portions of these levers 3, here shown as their inner ends, are for any one row arranged in a different plane to the corresponding portions of the levers forming another row for a purpose that will appear later. To bring about this disposition of the lever ends the keys or finger pieces 2, and their connected levers 3, may conveniently be arranged in tiers one above the other as seen in Figs. 2 and 3. These levers 3 are, in the present instance, rock levers, a fulcrum intermediate their ends permitting the inner end of a lever to be elevated upon a depression of the proper key. The several levers may be mounted in any suitable manner to confine them to their proper direction of movement; for instance, the outer ends of the levers in any row may rest in and be guided by suitable slots formed in a cross bar extending from side to side of the machine, while the fulcrum points for the levers may be formed by similar slots in a fulcrum bar secured to the machine framework or a fixture thereof. A constructive arrangement of this kind is particularly illustrated for one such rock-lever, where 3 designates a lever, the guiding slot for its outer end being formed in a rigid cross bar 5, which may be secured at its ends to the casing or framework B of the machine. The fulcrum-bar is designated by 6, and is fastened adjacent to its ends to fixtures 7, 7 extending from the framework. This latter may be of any suitable material and form and conveniently utilized as the means for fixing in place the various stationary supports required to maintain in proper position and relation the various operative mechanisms and parts involved, while the method of supporting and guiding the particular rock-lever 3 described will be understood to apply, in the present illustrated and described embodiment, to the other rock-levers. The forms and points of attachment of the various guide bars 5 and fulcrum bars 6 for the several rows are so modified and so designed according to the present construction as to bring the inner or operative ends of the levers 3, forming the several rows, into different horizontal planes, or, if desired, any other arrangement for attaining the same result may be adopted.

The actuation of a lever 3 as the result of moving the key 2 thereon serves to initiate the operative movement of a part normally having no such movement but conveyed periodically into such a position as will render the said movement of the rock-lever effectual for the purpose. It should be here mentioned that an intermediate transmitting device, to be described later, is inserted between each lever 3 and the part whose operative movement is to be initiated. The periodical movement of the said part is obtained by mounting the same upon a carrier or turret C, designed to have a rotary movement, and here shown as comprising end disks 8 and 8, rigidly secured together by a connecting sleeve 9. This sleeve is, in the present instance, for the purpose of permitting such rotary movement of the turret journaled to a stud 10, supported by the main frame B, or by an appurtenance thereof for convenience of access as here shown, where the stud 10 extends upward from the removable cup-shaped plate secured to the main frame. Motion is imparted to the turret C, in the present instance, by means of a shaft 11, driven from a convenient source of power by a pulley 12, and which is shown as extending upward through an opening in the stud 10 to the upper end thereof, where it is connected to the turret by means of a collar 13 secured to the shaft. Provision is also shown for taking up the wear due to the end thrust of the turret, and this provision has the further quality of permitting the turret to give or yield endwise slightly should the alinement of parts brought into coaction not be as designed, thus avoiding their cramping or wedging.

Inserted in a central recess in the collar 13 is a spring 14, bearing, in the present instance, at one end against an appurtenance 15 of the stud 10, and at the other upon a washer 4 resting upon a shoulder formed in the turret C. It is evident from this construction that the turret is constantly forced downward against its end bearing formed by the shoulder 17 upon the stud 10. Connection between the collar 13 and turret C may be a pin and slot one 18 to allow of this lengthwise adjustment.

Referring now to the previously mentioned part mounted upon the turret C and carried around by it as the latter rotates, this is here represented as made in the form of a rolling impressor or type wheel 19, (and it will be hereinafter designated mainly by the term impressor,) mounted upon the turret to rotate at times about its own axis. This impressor may thus partake of a double circular movement, that of revolution about the axis of the turret, and of rotation about its own axis. Any desired number of these revolving rotatable impressors 19 may be mounted upon the turret C within the limit of capacity of the latter, and it is intended that there shall be one impressor corresponding to each aforesaid horizontal row of rock-levers 3, the movement of any one of which in the same row will serve to initiate the rotary movement of the corresponding impressor. This rotary movement having once been commenced is continued by suitable means that will appear, but with this difference that the combined functional effect of the means for commencing the rotation and the means for continuing the same will result in turning a given impressor a different amount for each lever 3 with respect to a fixed point.

Proceeding now to a description of the means adopted in the present embodiment to initiate the rotary or operative movement, (for so such movement may be described,) of an impressor, to continue such movement, and to return the impressor to its normal or inoperative condition ready for the repetition of such cycle, it will be understood that such description applied in this case to any and all of the impressors carried by the turret C.

Each impressor 19 constituting the revolving and rotatable part is conveniently mounted for rotation by securing it to a separate shaft 20 journaled in the disks 8 and 8 of the turret. Rotation of a shaft 20 and the impressor 19 secured thereto may be effected by any appropriate means positive in action and certain in results when actuated. Such means are here shown and comprises a gear or toothed wheel 57 secured to each shaft 20.

The driver for rotating a gear wheel 57, and all of them, is shown as constituting a fixed internal gear 21 formed by teeth 22 arranged concentrically around the axis of rotation of the turret C, although this particular arrangement of teeth, it will be understood, does not represent the only means for effecting the rotation of a gear wheel. Preferably the mounting for these teeth 22 constituting the driver 21 involves the possibility of a tooth yielding endwise, as distinguished from a rigid condition thereof to minimize the injurious effect of continual impact and to permit a yielding of the tooth should an imperfect engagement of a gear wheel therewith be made. Such a mounting for the tooth as well as the form of the latter is shown in detail in Figs. 47 and 48, where 22 is the tooth provided with a shank 23, encircled by a spring 24, inserted between a collar 25 upon the body of the tooth, and a screw-plug 26 closing the end of the opening for the tooth in the gear block 27. This spring 24 serves to force the tooth 22 outward against a shoulder 28 presented by the block 27. The screw-plug 26 is, in this instance, provided with a center opening through which the shank of the tooth can slide for the purpose of steadying the latter in a backward movement.

Normally, that is, in an inoperative or idle condition, the gear-wheel 57 is out of engagement with the driver 21, being, in this instance revoluble in a plane somewhat above the central plane of the driver, and to enable the displacement from a position when operative or rotary movement can take place with the gear-wheel in mesh with the driver 21 to a position where no such movement can take place as above, the shaft 20 to which the gear or toothed wheel is attached is mounted upon the turret C to move lengthwise or axially in its bearing.

While in the particular machine illustrated and described, the operative condition is one corresponding to a depression of an impressor which becomes inoperative when elevated, by a suitable reversal of the mechanism, these respective relative movements might also be made to bring about conditions directly opposite to what they herein give rise to. The invention covers generally, therefore, a change in condition by an axial movement.

A suitable detent device is preferably employed to retain a gear wheel 57 in its depressed and elevated positions, (assuming the machine to be arranged horizontally) corresponding respectively the first with its operative and the second its inoperative condition. The form here adopted for such device comprises a detent finger 29, (see particularly Figs. 36, 38, and 44,) pivoted to a pin 30 extending from one of the disks 8 of the turret C, and pressed by a spring 31 into either one of a pair of grooves 32, $32^b$ formed in the periphery of the shaft 20 or an appurtenance 33 of the shaft.

The rotary motion of a gear wheel 57 and its corresponding impressor 19 is initiated by causing the shaft 20 to which they are affixed to turn slightly on its axis by means fully explained hereinafter, thereby depressing them through the medium of a cam-shaped portion 34, (which may therefore be designated as an actuating or cam member,) which is here shown to be integral with and upon the upper face of the appurtenance 33. Coacting with this actuating or cam member 34 is the properly formed face of a second actuating or cam member 36 carried by the turret C, and in the present instance made in the form of a sleeve encircling and forming one bearing of the shaft 20. This cam member 36 is, in order to co-operate properly with its opposed cam faces, rigidly mounted upon the turret C, so far as any considerable degree of possible relative rotative movement is concerned, a result that may be secured by a pin 37 screwed into the disk 8 and extending into a notch or groove 38, cut into the periphery of the sleeve formed by the cam member 36. A spring 40 may have its end or ends entering one or more notches 35 in the sleeve to permit the latter to yield slightly under the impact of the co-operating cam member to eliminate the undesirable effects of shocks.

Advisedly the attachment of the cam member 36 will be such as to permit its yielding lengthwise movement to reduce the shock when the two cam faces are brought together. For this purpose a spring 41, (see Figs. 3 and 22,) may be inserted between a shoulder 42 upon the cam-sleeve 36, and a shoulder 43 in the recess of the disk 8, exerting a sufficient tension to cause the downward movement of the shaft 20 and gear wheel 57 thereon when they are turned partly around to cause the coaction of the cam surfaces of the cam members 34 and 36, and the teeth of the gear wheel are free to mesh with the teeth of the driver 21, and yet permitting the sleeve to yield slightly to the impact of the cam face on the appurtenance 33 when the latter moves upward.

Moving in unison with each gear wheel 57 is a starting-arm 44, which may be conveniently attached to its corresponding shaft 20 at such a height thereon as will bring it in the proper horizontal plane to be actuated by means of the predetermined row of rock-levers 3. A number of teeth are altogether or partially removed from the periphery of each gear wheel 57, and the position of each such wheel, when no rotary or operative movement takes place, corresponds to that in which the toothless portion is adjacent to the driver 21, with the convex portion of the cam member 34 seated in this position in the concave portion of the opposed cam member 36, and the detent finger 29 lying in the lower groove 32 in the appurtenance 33, and holding the parts in this position. Assuming, now, the gear wheel 57 to be so elevated and in the act of being swung by the starting-arm 44 about its axis through the actuation of a rock-lever 3, in a manner that will appear later, this will cause the descent of the gear wheel, by reason of a coaction between the cam surfaces before mentioned, since the convex portion rides down and out of and is unseated from the concave portion, while the finger 29 simultaneously springs into the upper groove 32$^b$ and retain the parts so depressed. Engagement of the gear wheel with the driver 21 ensues, and the rotation of the turret C about its own axis results not only in the revolution of the gear wheel 57 and the parts moving in unison therewith about the axis of the turret, but likewise in the rotation of the gear wheel, its shaft 20, &c., about the axis of the shaft.

To permit a gear wheel 57 to make a complete rotation, immediately above the smooth peripheral portion thereof is arranged a complementary set of teeth 45, which may be formed in whole or in part upon a segment 45$^b$ secured to the radial portion of the wheel. The plane of the complementary set with reference to that of the smooth peripheral portion is such that when the gear wheel is elevated the teeth of the former are removed from possible engagement with the teeth of the driver 21, but when the gear wheel is depressed this set descends into the plane of the driving teeth of the driver 21, and, in conjunction with the main teeth of the gear wheel, permit the latter to be given a full rotation.

Referring now to the means for lifting the gear wheel 57 and destroying its rotary movement, this result may be conveniently accomplished by means of a cam device, and such is shown in the present instance. A cam segment or actuating member 46, (see particularly Figs. 21 and 22,) having a substantially curved, incline or conical surface 47 with respect to and coaxial with the axis of rotation of the turret C, is arranged in the path of an actuating arm 48, in the present case extending from each aforementioned appurtenance 33 of each shaft 20. The cam surface 47 of this segment will be of such length as shall insure the coaction of each arm 48 therewith at some point of the rotation of the corresponding gear wheel 57, as it rotates about its own axis and revolves about the axis of the turret C in engagement with the teeth of the driver 21. The arm 48 is so positioned with respect to the cam surfaces upon the corresponding cam members 34 and 36, that as the arm is brought around and is about to contact with the surface upon the cam segment 46, through the continued rotation of the gear wheel 57, the convex and concave portion of said cam members will be brought into juxtaposition one with the other, permitting the ascent of the gear wheel. The arm 48 thereupon is pushed upward by the lifting cam surface 47 to the highest position to which that surface is capable of lifting it, the gear wheel 57 having simultaneously passed out of mesh with the teeth of the driver 21; the final, complete positioning of the cam faces of the two cam members 34 and 36, with the convex portion fully seated in the concave portion, is accomplished by the action of the detent 29 in sliding down the slanting sides and into the lower groove 32, resulting in a pressure upward and causing the intimate bringing together of the cam faces into their closest relation. This corresponds to the position of the gear wheel in which no rotary or operative movement can take place and in which it will remain until its starting-arm 44 is again actuated.

The momentum of the gear wheel 57 and connected features when once set in motion is liable, especially at high speeds, to carry the same beyond the definite positions in which they should rest when rotation has ceased. To prevent this each gear wheel 57 is positively held from moving axially until this momentum has been destroyed by causing, in the present construction, the lower end of each rotating shaft 20 as its gear wheel approaches the point at which it stops rotating, to press to one side a curved bearing strip 49, provided with an extension 50 having a slot with a pin 51 passing therethrough, and also having ears 52, forming guides and pressed by a spring 53 against a shoulder 54. The height of this strip 49 is such as to permit it to swing back under the end of a shaft 20 when the same is elevated by the cam arm 48, thereby preventing the descent of the shaft and attached features until the former has passed free of the strip.

Preferably the impact of a gear wheel 57 and connected parts as the same move downward for the former to engage with the teeth of the driver 21 is taken by a resilient stop plate, here shown as consisting of a curved strip 55 forced upward against the pressure of the impact by the spring 56.

It is designed in the construction and principle of operation of the mechanism that different, although equally definite amounts of rotation may be given to a gear wheel 57 from the instant such rotation is commenced up to the time that the wheel passes in proximity to a definite point fixed relatively to the framework of the machine, and that these various movements shall be under absolute control. This will render the mechanism suitable for printing or impressing a desired sequence of characters upon the surface of paper or other substance, and to this end each impressor 19 is, or may be, provided with a plurality of impression devices or types 58. At the point mentioned above as being fixed relatively to the framework of the machine and at which an impressor 19 is designed to operate in impressing or printing a character in this instance, is arranged a printing platen 59, (see Fig. 19, for instance,) designed to co-operate with the impression devices or characters upon the impressor. It should be mentioned that the descent of the shaft 20 may be limited by a collar 60 attached to each shaft 20 and impinging against the upper disk 8 of the turret, while the disk may also be provided with an oil guard 61.

Passing now to a description of the means for causing the operation of a rock-lever 3, to result in the initiation of the rotary movement of that particular gear wheel 57, which that row of levers is designed to affect, this is effected by a series of selective devices consisting of a number of latch mechanisms, the actuation of any one of which causes the bolt or reciprocating latch thereof to protrude into the path of the corresponding starting-arm 44. This latter as it is carried around on the turret is caused to be swung around by said bolt or latch, setting up the rotation of the gear-wheel 57, which is continued as aforesaid, its motion, however, before leaving the bolt or latch resulting in the pushing back and resetting of the latter through the action of the socket 150 on the arm against the end of the latch. This latch mechanism may be of any suitable form and construction, as, for instance, that shown in Patent No. 403,373, granted to me on May 14th, 1889. The essential parts of the mechanism there set forth are shown in Figs. 49 to 53, inclusive, and will be here briefly described, reference being had for a more detailed detailed descripion of its construction and operation to my said prior patent. As here shown, 62 is the reciprocating latch or bolt with two catches 63 and 64 thereon, one in advance of the other, the latch being also provided with a collar 65 for limiting its forward movement under the influence of the spring 66 encircling the latch. The escapement 67 is a substantially rigid bar or plate pivotally supported at 68 in a notch 69 in the bore of the opening in the latch block 69$^b$ in which the individual mechanisms are located. The escapement 67 is provided with a catch 70 co-operating with catch 63 on the latch, and a catch 71 co-operating with the catch 64. A projecting arm 72 of the escapement serves to operate it. An angle-lever 73 has a tongue 73$^b$ which is pivotally supported in a notch 74 in the escapement 67. This pivotal end is slotted as shown at 300 to pass over the latch, and at the other end is slightly hollowed out, (see 301) to bear upon the latch between the two catches 63 and 64. The conical sleeve of the patent is shown at 75, against which the spring 66 bears, serving to press the hollowed-out end of the angle-lever 73 against the latch and force one of the catches thereon into engagement with the corresponding catch on the escapement. The distance between the catches on the latch 62 is different from the distance between the co-operating catches upon the escapement, for the purpose of causing the engagement of co-acting catches whether the arm 72 of the escapement 67 be in a position assumed by it when it has tripped the latch or in its normal position when the pressure upon it has been released as described in said patent. The relation between the parts is such that the tripping of a latch is accomplished by a motion of the arm 72 of its escapement away from the axis of the opening in which the mechanism is held. Hence, bearing this in mind, a transmitting lever may be inserted between the operative end of a rock-lever 3 and the arm 72, if the conditions to be met in the structural arrangement of the parts require it as shown at 76, in Fig. 3.

The latch-block 69$^b$, previously mentioned, affords a convenient means for supporting the several rows of latch mechanisms. It is fixed relatively to the frame of the machine in such a position as to permit the end of any latch or bolt 62 in a horizontal row thereof to protrude into the path of the corresponding starting-arm 44.

Referring to a plan view of the row of latch ends, for instance Fig. 19, it will be noticed that they are arranged in a circular arc concentric with the axis of the turret C, and at decreasing distances from the platen 59; hence, coaction of a starting-arm 44 with the several latches in its corresponding row will occur at points unequally removed from the fixed point, and therefore different amounts of rotation will be imparted to the gear-wheel 57, from whose shaft 20 the starting-arm extends for each latch, and, similarly, for each rock-lever 3 in the row. This will effect the bringing of different characters upon the impressor 19 opposite the platen 59, according to the rock-lever operated, while the printing or impression is effected by the rolling of the predetermined impression device or type over the paper, if such be the material used on the platen. Each said impressor 19 may be supplied with as many types or characters as there are rock-levers 3 in its corresponding row, and the position of each type on the wheel is regulated by the amount the impressor rotates when the corresponding lever 3 is actuated.

A traversing mechanism embodying certain novel features, and which may be used for carrying a sheet of paper or other material past the printing or impression point or over the printing platen 59, is shown in Figs. 1 to 18 inclusive although the same constitutes subject-matter claimed in a separate application filed by me and concurrently pending with the present application. It is there shown to comprise a traveling carriage 77 provided with a suitable guiding surface 78 by which the carriage is supported and permitted to travel to and fro upon the corresponding guideway 79 on the framework B of the machine. It is designed that an intermittent or step-by-step motion shall be imparted to the carriage in one direction, and for this purpose it may be provided with a rack 80 meshing with a pinion 81, driven intermittently by means described later.

The carriage 77 may be confined to a longitudinal motion along the guideway 79 by the locking-piece 82, affixed to the framework B or an appurtenance thereof, and along which locking-piece 82 the guiding surface $82^b$ upon the carriage may slide. If the locking-piece is made tapering in form so that it may be adjusted to a fixed position as shown in Fig. 54, provision will then exist for taking up any wear that may arise.

To adapt the traversing mechanism to the requirements of a typewriting-machine, means are illustrated and will now be described for permitting the return of the carriage after it has been traversed to its extreme left-hand position looking from the front toward the rear of the machine, as well as allowing a movement in either direction to be made at any time by the operator. The various parts concerned in the feed of the paper or other substance at right angles to the carriage movement will also be described.

Return movement, that is, movement in a direction from left to right, as seen from the front of the machine, is in the present case permitted by throwing the rack 80 and pinion 81 out of gear, and is effected by the tape or band 83 attached at one end to the carriage 77, and passing at the other end over a spring-controlled disk or drum $83^b$. This drum, in the present instance, is shown as being mounted in the frame B and freely rotatable about a sleeve 84, which may itself rotate on a fixed stud 85, while one end of a coiled spring 151 is secured to said drum $83^b$, the other end being attached to the sleeve 84. The tension of this spring may be adjusted by means of a second coiled spring 86 secured at one end to the sleeve 84, and at the other end to a worm-wheel 87, rotatable on its axis by means of a shouldered worm or screw 88, this latter being so positioned as to be capable of manipulation from outside the framework B.

The means illustrated for throwing the pinion 81 and rack 80 into and out of engagement will now be described in detail.

A rib 89, (see Fig. 55, particularly,) formed by channels extending lengthwise of the carriage 77, determines whether the latter will traverse with said rack 80 and pinion 81 in mesh or move with the two out of gear according as a pin 90 is upon one or the other side of the rib. It should be mentioned that the various guiding surfaces controlling the movement of the carriage are such as to permit a crosswise or lateral swing of the carriage to engage or disengage the teeth of the rack and the pinion. The pin 90 is depressible against the tension of a spring 91 to bring it below said rib 89 and permit the rib to shift from one side to the other of the pin. This shifting, due to the swinging of the carriage upon the guideway 79, is, in the present case, caused automatically at each end of the carriage travel by means of a cam groove adjacent to each end of the carriage, and which may form a continuation of the same depth and coincide with the mentioned channels or they may lead from a point below the edge of the rib 89 to a point adjacent to the edge thereof, each groove ending in a transverse passage or slot leading from one groove to the other through which the pin 90 moves when the carriage swings. One of the grooves or channel continuations 92 is here shown in a switch block 93, having the transverse passage 94 at the end of the groove, while the other groove 95 may be formed in a second switch block 96 with its transverse passage 97 adjacent to the other end of the rib 89. Preferably the switch block 96 is made to be adjustable along the rib 89, as when the mechanism is used in a typewriting machine this adjustability will permit the length of a line of printed characters to be varied. For this purpose the block may be fitted to slide along the rib 89, and the suitably formed side faces thereof and locked in position by a pin 98, extending from a spring finger 99 attached to the block, and entering any one of a number of holes 100 in the body of the rib.

The transverse or swinging movement of the carriage 77 when the pin 90 comes opposite to either transverse passage 94 or 97 may be effected by gravity, springs or otherwise. The construction here adopted consists in so suspending the carriage that normally gravity tends to swing it away from the pinion 81, a movement which is free to occur when the carriage is in its extreme left-hand position looking from the front toward the rear of the machine, while when the carriage has returned and is adjacent to its extreme right-hand position and before it is ready to begin its step-by-step traverse toward the left, a friction-roller 101 supported by the carriage has been brought in contact with a leaf-spring 102 extending from the framework B. Further movement to the right increases the tension upon this spring 102, until, when the pin 90 is opposite the transverse passage 94, the spring swings the carriage outward against gravity and causes the engagement of pinion 81 and rack 80. The coacting surfaces of the pin 90 and the passages 94 and 97 in their respective switch blocks may well be such as to facilitate and complete this tranverse movement when once the same is started.

To permit a disengagement of the pinion 81 with the rack 80 in any intermediate position of the carriage, and to enable such disengagement to be under the control of the operator, a push-rod 103 may be carried upward toward the top of the machine, and at its lower extremity has an extension 104 taking into an opening in the shank of the pin 90, while the push-rod 103 is itself encircled by the main lifting spring 91. A finger-piece 105 at the top of the framework B enables the operator to depress the push-rod. A depression of this rod will withdraw the pin 90 from that side of the rib 89 on which it is located when the pinion 81 and rack 80 are engaged, assuming that such a condition exists, and the carriage 77 may swing downward by gravity away from the pinion.

A handle 106 affords a convenient means for manually controlling the position of the carriage when free to move.

A paper-feeding device is shown upon the carriage 77, comprising the feed-roll 107 and one or more pressure rolls 108, designed to be firmly pressed against each other to effect a feeding movement of the paper. The former roll may be as shown, a plain cylindrical one, rotatably mounted at the sides of the carriage, and provided adjacent to one end with a knurled disk 109 or other means for conveniently turning the same by hand. The pressure rolls 108 are shown to here comprise two short rollers each mounted to rotate in a frame 110, secured to a rod 111, extending from side to side of the carriage, and which may be removably secured in place by an arm 112, at each end fitting into a bracket 113 extending from the side of the carriage. The periphery of either the feed-roll 107 or the pressure rolls 108 is preferably made of some compressible material to make their feeding action certain and reliable.

For the purpose of moving the rolls toward and away from each other to grip or release the paper or other material, the roll 107 is, in the present case, rotatably mounted in an arm 114 at each end. These arms 114 and 114 are pivotally connected to the carriage 77 or appurtenance thereof, and their downward movement corresponding to a releasing of the paper is limited by a suitable stop or shoulder 115 upon each arm which coacts with a corresponding shoulder upon the carriage. Each arm 114 is swung downward on its pivot by means of a pair of jointed links 116 and 117. The former link of each pair is pivoted to the carriage as shown at 118, while the other link 117 may be extended in the form of a finger-piece 152, and is swiveled to an arm 114 by a pin 119. When either finger-piece 152 is pushed back the pairs of links 116, 117 swing on their connections, carrying the roll 107 away from its companion or pressure rolls 108. Upon being brought forward, however, the links straighten out under the control of the pivotal connection of the arms 114, 114 with the carriage, assume a different angle with respect to each other, and sustain the thrust between the feed and pressure rolls upon a shoulder 120 of each link 116 and corresponding shoulder $120^b$ of the companion link.

It is designed that the feed-roll 107 shall have a step-by-step rotary movement to effect an intermittent feeding of the paper across the platen at right angles to its traverse feed with the carriage. For this purpose the roll 107 carries a ratchet wheel 121 with which engages a pawl 122 pivoted to an arm 123, which may swing about an axis coinciding with the axis of the roll 107. To hold this pawl 122 in engagement and out of engagement with its ratchet wheel 121 it is provided with a tooth 124 pressed into either one of two notches 125, 126, corresponding to the two mentioned positions of the pawl, respectively, by a spring 127. Some device for holding the roll 107 from rotation when the pawl 122 is sliding backward over the teeth of the ratchet wheel 121 is supplied. For instance, this device may consist of a detent 350 on an elastic arm 351, by which it is pressed toward and into the notches on a notched wheel 352.

Adjacent to the lower portion of the carriage is a feed-roll-actuating arm 128, connected with the pawl-carrying arm 123 by a link 129, whose lower end is shown as having provision for adjustment along the actuating arm 128, such provision comprising a slot 130 in the arm, and a nut 131 for clamping the end of the link in a desired position in the slot. This construction will permit the throw of the pawl-carrying arm 123 to be regulated, and thus the amount of feed to be varied.

The arm 128 is swung upon its pivot by the motion of a finger 132, transmitting motion, in this instance, through a pair of toothed segments 133 and 134. The finger 132 extends across the line of an abutment 135, supported on the framework B, and against which the finger strikes when the carriage 77 is approaching the right-hand extremity of its travel, thus actuating arm 128 and causing the roll 107 to turn and the paper to feed forward. Spring 136 attached at one end to the arm 128, and at the other to a fixed portion of the carriage, serves to normally elevate the arm 128, and to maintain the finger 132 pressed toward and in a position to coact with the said abutment 135.

The platen 59 is supported on a bar or rod 137, extending from end to end of the carriage and fastened to the arms 114, 114, while it is fitted to the platen to permit the supporting bar to slide relatively thereto. Preferably the construction and support of the platen will be such as to permit it to yield slightly backward when an impression is made, as distinguished from a rigid condition thereof, and for this purpose it is shown as being made in two parts, the platen proper 59 being mounted upon the supporting bar 137 by means of a guide block 139, relatively to which latter the platen proper 59 may slide in suitable guides 360 while it is pressed forward by a spring 140, compressed by a nut 141, screwing into a threaded pin 142 extending from the guide block 139 against a stop or abutment 143, here shown to be adjustable, and which projects from the platen proper 59.

The platen is retained in correct position relatively to an operating impressor by a connection extending to the side of the machine, thus being located at the side edge of the paper and not intruding into the path thereof or interfering with the feed. This connection may embody a curved bracket 144 supported on the bottom extension of the framework B, and connected with the platen 59 by means of a link 145. The means for connecting the ends of this link 145 are preferably such as to permit the free movement of the platen 59 when displaced from its normal position, due to the traverse or swinging movements of the carriage 77 and the movements of the arms 114 and 114 during the act of releasing or gripping the paper; for instance, at the bracket end of the link 145 the connection of the link may be made with the bracket by means of a fitting 146 swiveled to the bracket 144, and to which the link 145 is pivoted in such a manner as to permit it to swing in two planes substantially at right angles to each other. At the other end the connection of the link may be a ball and socket one.

The bend of the bracket 144 is shown as being sufficiently deep not to interfere with the carriage movement even when the plane of the bracket corresponds to the plane of such movement as shown in full lines in Fig. 1.

Preferably the bracket 144 will be pivoted to the extension of the framework B to permit the bracket to be swung around into the position shown in dotted lines out of the way. Suitable guides 200, 201 for the paper may be arranged on the carriage.

Referring now to the means embodied in this machine for obtaining an intermittent traversing movement of the carriage 77, this is shown most clearly in Fig. 28, and may be conveniently located in the bottom plate or appurtenance $b$ of the machine. A star or feed wheel 147 is mounted to rotate with its arms projecting into the path described by the lower ends of the shafts 20, when these latter are depressed and in a position in which the several gear-wheels 57 are in engagement with the driver 21. When so depressed the lower end of a shaft contacts with one of said arms and carries the star wheel around sufficiently to cause the following arm to extend across the path of the lower end of a suceeding depressed shaft. A gear-wheel 149, moving in unison with the star wheel 147, transmits its motion through an intermediate gear 157, in this instance, to a gear-wheel 158, affixed to the shaft 158$^b$ carrying the pinion 81, meshing at times with the rack 80. The relative diameters of these various gear-wheels constituting the transmitting train are proportioned to secure the proper amount of movement of the carriage 77 at each step. Means are also shown for limiting the movement of the star wheel 147 to the definite amount imparted to it by contact with a shaft end, and for nullifying the tendency of the momentum of the moving parts to carry it beyond its proper fraction of a complete rotation. This means comprises a stop 159, extending across the plane of the arms of the star wheel 147, and against which each arm successively strikes. It is yieldingly supported in this its proper upright position by a spring 160, which permits the swinging of the stop 159 downward out of the path of an arm when the star wheel is pushed around but serves to stop the rotation of the star wheel when moving under its momentum alone. To prevent a reverse rotation of the star wheel 147, there is supplied a buffer consisting of a pivoted finger 161 pressed upward to have its end face normally across the plane of the arms of the star wheel by a spring 162. The several arms of the star wheel 147 successively slide over the top surface of the finger 161, pressing the latter away until the edge of the deflecting arm has passed the end of the finger when the latter springs upward across the face of this arm and blocks its backward movement.

Mechanism for inking a type or impression device immediately preceding the making of the impression is illustrated in Figs. 28 to 34, inclusive. The parts involved are shown as being conveniently located in an appurtenance $c$ of the main framework B, and for convenience of access this appurtenance may have a hinged cover 163 secured by a catch 164, and located directly over the mechanism. The driving shaft of the mechanism is shown at 165, mounted in any suitable manner to rotate in bearings and receiving motion, in the present instance, through the medium of gears 166 and 167, (see Fig. 28,) the latter being affixed to a shaft 169, actuated by a worm and worm-wheel connection 170 from the turret C or part rotating therewith. To enable the appurtenance $c$ to be taken off from the main framework B and yet cause the actuation of the shaft 165 when placed in position, the lower end of this shaft 165 may be angular to fit into a corresponding socket in the gear 166 while it is pressed downward therein by a spring 171. An ink-distributing roller is shown at 172, whose shaft $172^b$ may be mounted to rotate in bearings upon a bracket 173, while it may be driven by gears 174, 175, from the driving-shaft 165. This shaft $172^b$ is shown as being free to move laterally at its upper portion. An inking roller 176 is so mounted as to permit its periphery to come in contact with the character upon an impressor or type wheel 19 as the latter is carried around by the turret C, and while it is rotating upon its own axis prior to the contact of the character with the paper on the platen 59. The peripheral surface of the inking roller 176, and the ink-distributing roller 172, will be suitably prepared for the purpose for which they are intended, and they may be driven in opposite directions, motion being communicated to the inking roller 176 by means of an intermediate gear 177, driven from a gear 178 upon the driving-shaft 165 and engaging with a gear 179 secured to the shaft 180 of the inking roller 176. Preferably the inking roller 176 will be so mounted as to be capable of adjustment toward and away from the type or impression device that is about to be inked, and for this purpose the bearings of the shaft 180 may be in an eccentric sleeve 181 on an arm 182, extending to an accessible point on the outside of the machine. An edge of the opening through which this arm 182 projects may be roughened as shown at $182^b$, the better to hold the arm in a given position. An ink-conveying roller 183 is mounted adjacent to the distributing roller 172, which latter may be held up against the conveying roller and against the inking roller 176 by means of pressure rollers 184, 184 carried in a frame 185 and urged against the ink-distributing roller 172 by the pressure of a pin 186 forced inward by a spring, not shown. These pressure rollers 184, 184 are shown as having a lengthwise movement across the face of the ink-distributing roller 172, for the purpose of distributing the ink uniformly over the surface thereof, by causing the ends of their pivotal axes to bear upon a cam surface $184^b$ formed upon the radial portion of the intermediate gear 177. The ink-box 187 may be used to hold an absorbent material impregnated with ink, or ink may be put directly into the box without the use of any such vehicle, the mechanism being particularly designed to utilize ordinary painters' ink for the purpose of inking a type. The material ink or ink charged is exposed at an opening in the end of the box which permits it to come in contact with the periphery of the conveying roller 183. Preferably this box 187 is made adjustable toward and away from the conveying roller to graduate the amount of the ink taken up thereby, and for this purpose a screw 188 is shown which may have threads of different pitches, one of the threads engaging with a corresponding thread on the main framework B, and the other thread with one on the box 187 of extension thereof, and by the difference of their pitches producing, when the screw is turned, an adjustment of the box.

In the event that a traversing movement of the carriage 77 is desired without any type being carried in juxtaposition to the platen 59, for instance, in the making of a space on a typewriting-machine, one of the reciprocating latches or bolts 62 of the latch mechanism may be so arranged with respect to its distance from the fixed point or platen 59, that its actuation of a starting-arm 44 will be followed by a rotation of the corresponding gear-wheel 57 through such an arc as will bring a plan or smooth portion of the impressor 19 opposite the fixed point or platen, or in other words, a portion of the impressor unsupplied with a type or impression device. As a result of the longitudinal or axial movement of the shaft 20, however, the movement of the carriage 77 will take place in the manner already pointed out, although no impression be made.

The usual typewriter spacing-bar is shown at 189 in Figs. 1, 2, and 3, operatively connected with a rock-lever 190, which may be mounted and communicate its motion to a latch mechanism after the manner already described.

A decided and desirable result is attained in the use of this machine, to wit—that of plainly visible writing or impressions. Manifestly, the several impressors revolving rapidly past the fixed point or platen with open spaces between them offer but little obstruction to the sight in viewing what has occurred at the impression point, and this obstruction is further minimized by the fact that the impressors occupy different planes according as they are operative or inoperative.

In using terms of direction it will be understood that the same are relative and apply only to the particular position occupied by the machine as herein shown.

Constructed and operating in the described way the various mechanisms and combinations of parts when combined for conjoint action operate in a manner that may be described as follows—Assuming the turret C to be in rotation from a convenient source of power, the depression of a key or finger-piece 2 actuates the corresponding rock-lever 3 and trips a latch or bolt 62. The starting-arm 44 which lies in the plane of the projected latch will coact with the latter when brought around to it by the rotation of the turret C. This arm 44, and the corresponding gear-wheel 57 and impressor 19, connected to its shaft 20, are, it is assumed, in an inoperative condition immediately preceding their arrival at the latch, as shown in Fig. 19. Co-action between the latch and the arm takes place, and the latter swings around carrying the shaft 20, &c. with it. The arm 44 in its turn pushes back the latch until the same is caught by the pair of catches 63 and 70, or 64 and 71, of the latch mechanism. (See in part, Fig. 21). The shaft 20 has, by the coaction of the cam members 34 and 36, moved longitudinally or axially downward, bringing the toothed wheel 57 into engagement with the teeth of the driver 21 and the detent finger 29 into the upper one 32 of the two grooves 32, 32$^b$. Continued rotation of the turret C rotates this gear-wheel and connected parts upon their axis until the platen 59 is reached, when the corresponding type or impression device which has been inked on the way by the inking roller 176, rolls over the surface of the paper or other object which may be thereat. In the meantime, before impression, the lower end of the shaft 20 has driven the star wheel 147 partly around, causing a movement of the carriage 77 one step forward in the manner already particularly described. For the position of the parts during the act of making an impression see Fig. 23. At some point after it has passed the platen 59 the shaft 20 will have brought the cam arm 48 in contact with the cam surface 47 of the segment 46, which, combined with the rotary movement of the shaft will effect a reverse axial or lifting movement of the shaft, in which position it is retained by the detent finger 29, snapping back into the lower groove 32$^b$. The concave and convex portions of the cam surfaces 34 and 36 are now in close conjunction with each other, and the rotary movement has brought that part of the gear-wheel 57, over which a portion of the teeth is absent, adjacent to the driver 21 and lifted the wheel, so that the complementary set of teeth 45 on the segment 45$^b$ are lifted free of the driver. The end of shaft 20 will also have ridden up on top of the bearing strip 49. See Fig. 25 for positions of the parts just prior to their final position corresponding to an inoperative condition with the teeth of the gear-wheel 57 out of engagement with the driver 21. This procedure is repeated when any key 2 is depressed, a different impression, however, being made for each key as already explained. The carriage movement is supposed to be taking place from right to left as seen from the front of the machine or in an opposite direction looking at the machine from the rear, the pinion 80 and rack 81 being in engagement; see Figs. 7 and 8. When the carriage has moved to its extreme position at the right as seen in Fig. 7, the pin 90 will have come opposite the traversed opening 97 in the switch block 96, and the carriage will be swung toward the machine unmeshing the rack and pinion as shown in Figs. 9 and 10. The carriage 77 will now be automatically drawn to the left as seen in Fig. 9 by the band or tape 83. When near its extreme left-hand position, (see Figs. 11 and 12,) the finger 132 will contact with the abutment 135 bearing the arm 123 downward by means of the connecting mechanism and causing a rotating of the feed-roll 107. In its final left-hand position the carriage will bring the transverse passage 94 opposite the pin 90, and under the influence of the leaf-spring 102 the carriage will be swung away from the machine and bring the rack and pinion 80 and 81 into gear. This is shown in Figs. 13 and 14. A step-by-step traverse of the carriage now withdraws the finger 132 from contact with the abutment 135, permitting the slipping of the pawl 122 over the teeth of the ratchet wheel 121 by the contraction of spring 136, (see Figs. 15 and 16.) If it is desired at any time to release the carriage for the purpose of moving it by hand, the finger-piece 105 may be depressed, withdrawing the pin 90 beyond the edge of the rib 89 and allowing the carriage to swing back from the pinion 80 when it may be slid in either direction. Figs. 17 and 18 show the position of the feed-roll 107 when the same has been swung back away from its pressure roll 108 by the pressure of the finger on the link 117.

Having described my invention, I claim—

1. The combination with a turret rotatable upon its axis, of an impressor mounted upon the turret upon an independent axis, and means for axially shifting said impressor.

2. The combination with a carrier or turret, of an impressor mounted thereon upon an independent axis, and means comprising a cam face for shifting said impressor axially in one direction.

3. The combination with a rotary carrier or turret, of an impressor rotatably mounted thereon, of means comprising cam faces for shifting said impressor axially in both directions.

4. The combination with a rotary carrier or turret of an impressor rotatably mounted thereon upon an axis parallel with the turret axis, and means comprising an actuating member moving in unison with said impressor for shifting the impressor axially in one direction.

5. The combination with a rotary carrier or turret, of a shaft mounted thereon for axial and rotary movement, an impressor secured to said shaft, and means for shifting said shaft axially.

6. The combination with a rotary carrier or turret, of a shaft mounted thereon for axial rotary movement, an impressor secured to said shaft, means for shifting said shaft axially, and means for rotating the shaft when axially shifted.

7. The combination with a rotary carrier or turret, of a shaft mounted therein, an impressor carried by the shaft, and means comprising a cam face for axially shifting the shaft.

8. The combination with a rotary carrier or turret, of a shaft mounted thereon, an impressor secured to the shaft, means comprising an actuating member moving in unison with said shaft for shifting the same axially in one direction, and means comprising a cam face for axially shifting said shaft in the opposite direction.

9. The combination with a rotary carrier or turret, of a shaft mounted thereon, an impressor secured to the shaft, means for shifting the shaft in one direction, and means comprising a cam face for returning the shaft.

10. The combination with a rotary carrier or turret, of a shaft mounted thereon, an impressor secured to the shaft, means for shifting the shaft in one direction, means comprising a cam face for returning the shaft, and means for rotating the shaft when shifted.

11. The combination, with a rotary carrier or turret, a shaft mounted thereon which is adapted to have an independent rotary movement about its own axis, and an impressor secured to said shaft, of means comprising an actuating member moving in unison with said impressor, and a coacting actuating member mounted upon the turret for shifting said shaft axially in one direction.

12. The combination, with a rotary carrier or turret, a shaft mounted thereon which is adapted to have an independent rotary movement about its own axis, and an impressor secured to said shaft, of means comprising an actuating member moving in unison with said shaft, and a coacting actuating member mounted upon the turret, a rotation of said shaft about its axis causing the coaction of the actuating members and thereby a shifting of the said shaft axially.

13. The combination, with a rotary carrier or turret, a shaft mounted thereon which is adapted to have an independent rotary movement about its own axis, and an impressor secured to said shaft, of means comprising an actuating member moving in unison with said shaft, and a coacting actuating member mounted upon the turret for shifting said shaft axially in one direction; and means comprising a cam face on a fixed actuating member, and a coacting actuating arm moving in unison with said shaft for shifting said shaft axially in the opposite direction.

14. The combination, with a rotary carrier or turret, a shaft mounted thereon which is adapted to have an independent rotary movement about its own axis, and an impressor secured to said shaft, of means comprising an actuating member secured to said shaft, and a coacting actuating member mounted upon the turret for shifting said shaft axially in one direction; and means comprising a cam face on a fixed actuating member, and a coacting actuating arm extending from the shaft for shifting said shaft axially in the opposite direction.

15. The combination, with a rotary carrier or turret, and an impressor mounted thereon which is adapted to have an independent rotary movement about its own axis, of means for shifting said impressor axially; and a yielding impact device for taking the blow of the axially moving impressor.

16. The combination, with a rotary carrier or turret, and an impressor mounted thereon which is adapted to have an independent rotary movement about its own axis, of means for shifting said impressor axially; means for rotating the impressor about its own axis; and a yielding impact device for taking the blow of the axially and rotatively moving impressor as it is brought to rest.

17. The combination, with a rotary carrier or turret, and a shaft mounted thereon which is adapted to have an independent rotary movement about its own axis, and an impressor secured to said shaft, of means for shifting said shaft axially; and means for rotating the shaft about its own axis, comprising a spring-supported actuating member for taking the blow of the moving shaft and impressor as they are brought to rest.

18. The combination, with a rotary carrier or turret, and a shaft mounted thereon which is adapted to have an independent rotary movement about its own axis, and an impressor secured to said shaft, of means for shifting said shaft axially; and means for rotating the shaft about its own axis, comprising a spring-supported actuating member forming a sleeve about the shaft for taking the blow of the moving shaft and impressor as they are brought to rest.

19. The combination, with a rotary carrier or turret and a part mounted thereon which is adapted to have an independent rotary movement about its own axis, of means for shifting said part axially, comprising an actuating member moving in unison with said part; and a coacting member mounted upon the carrier.

20. The combination, with a rotary carrier or turret, and an impressor mounted thereon which is adapted to have an independent rotary movement about its own axis, and is capable of being shifted from one axial position to another, of means for rotating the impressor about its own axis when in one of its axial positions.

21. The combination, with a rotary carrier or turret, and an impressor mounted thereon which is adapted to have an independent rotary movement about its own axis and is capable of being shifted from one axial position to another, of means for rotating the impressor about its own axis when in one of its axial positions, said means operating to commence such rotary movement when the impressor is in one of its axial positions which is continued when the impressor has reached another axial position.

22. The combination, with a rotary carrier or turret, and an impressor mounted thereon which is adapted to have an independent rotary movement about its own axis and is capable of being shifted from one axial position to another, of means for rotating the impressor about its own axis, said means comprising a starting-arm adapted to commence such rotary movement when the impressor is in one of its axial positions, and mechanism continuing the same when the impressor has reached another axial position.

23. The combination, with a rotary carrier or turret, a part mounted thereon to be capable of an independent rotary movement about its own axis, and means for shifting said part axially, comprising an actuating member moving in unison with said part, and a coacting member mounted upon the carrier, of a starting-arm for initiating the said independent rotary movement of said part.

24. The combination, with a rotary carrier or turret, and an impressor mounted thereon which is adapted to have an independent rotary movement about its own axis and is capable of being shifted from one axial position to another, of a detent device comprising a detent-finger and suitable grooves corresponding to the axial positions of the impressor for holding the latter in such positions.

25. The combination, with a rotary carrier or turret, a part mounted thereon to be capable of an independent rotary movement about its own axis, and means for shifting said part axially, comprising an actuating member moving in unison with said part, and a coacting member mounted upon the carrier, of a starting-arm for initiating the said independent rotary movement of said part; and a device for holding said part in its extreme axial positions.

26. The combination, with a rotary carrier or turret, a part mounted thereon to be capable of an independent rotary movement about its own axis, and means for shifting said part axially comprising an actuating member moving in unison with said part, and a coacting member mounted upon the carrier, of a starting-arm for initiating the said independent rotary movement of said part; and a device comprising a spring-pressed detent-finger for holding said part in its extreme axial positions.

27. The combination, with a rotary carrier or turret, a part mounted thereon which is adapted to have an independent rotary movement about its own axis, means for shifting said part axially in one direction, comprising an actuating member moving in unison with said part, and a coacting member mounted upon the carrier, and means for shifting said part in a reverse direction, comprising an actuating member moving in unison with said part, and a fixed coacting cam face, of a starting-arm for initiating the said rotary movement of said part; and a device for holding said part in its extreme axial or longitudinal positions.

28. The combination, with a rotary carrier or turret, a part mounted thereon which is adapted to have an independent rotary movement about its own axis, means for shifting said part axially in one direction, comprising an actuating member moving in unison with said part, and a coacting member mounted upon the carrier, and means for shifting said part in a reverse direction comprising an actuating member moving in unison with said part, and a fixed coacting cam face, of a starting-arm for initiating the said rotary movement of said part; and a device comprising a spring-pressed detent-finger for holding said part in its extreme axial or longitudinal positions.

29. The combination, with a rotary carrier or turret, and a part mounted thereon which is adapted to have an independent rotary movement about its own axis, of means for shifting said part axially; a starting-arm for initiating the said independent rotary movement of the said part; and a device for holding the part in its extreme axial positions, comprising a spring-pressed detent-finger, and companion notches or grooves.

30. The combination, with a rotary carrier or turret, a part mounted thereon which is adapted to have an independent rotary movement about its own axis, of means for shifting said part axially; and a yielding impact surface for receiving the blow arising from the axial movement of the part.

31. The combination, with a rotary carrier or turret, and an impressor mounted thereon which is adapted to have an independent rotary movement and about its own axis, and is capable of being shifted from one position to another, of means for rotating the said impressor about its own axis when the impressor is in one of its axial positions; means for shifting the impressor to another axial position for stopping said rotary motion of the impressor; and a detent device comprising a detent-finger and suitable grooves corresponding to the axial positions of the impressor for holding the latter in its axial positions, one of said grooves having an inclined side co-operating with said detent-finger to finally position the said impressor in its inoperative angular position.

32. The combination, with a rotary carrier or turret, a toothed or gear wheel mounted thereon to be capable of an independent rotary movement about its own axis and having an inoperative or smooth portion, a starting-arm for initiating the said rotary movement of the gear-wheel, an impressor or type-wheel moving in unison with said gear-wheel, and a driver for continuing the rotary movement of the gear-wheel, of means for shifting said gear-wheel axially to bring an inoperative or smooth portion of said wheel adjacent to the driver, or an operative or toothed portion adjacent thereto, whereby a rotation of said gear-wheel may be effected; a detent device for holding said gear-wheel in its axial positions; and a resilient impact plate for receiving the blow of said shaft when the same is moved axially.

33. The combination, with a rotary carrier or turret, a gear or toothed wheel mounted thereon and which is capable of an independent rotary movement about its own axis, and having an inoperative or smooth portion, a starting-arm for initiating the said rotary movement of the gear-wheel, and a driver for continuing such movement, of means for shifting said part axially to bring an inoperative or smooth portion of said gear-wheel adjacent to the driver, or an operative or toothed portion adjacent thereto, whereby an intermittent rotary movement of said gear-wheel may be effected; and means for positively preventing the return of said parts from an inoperative axial position to an operative axial position until said starting-arm is again actuated.

34. The combination, with a rotary carrier or turret, a toothed or gear wheel mounted thereon to be capable of an independent rotary movement about its own axis and having an inoperative or smooth portion, a starting-arm for initiating the said rotary movement of the toothed wheel, an impressor or type-wheel moving in unison with said gear-wheel, a shaft to which said impressor and gear-wheel are secured, and a driver for continuing the rotary movement of the gear-wheel, of means for shifting said gear-wheel axially to bring an inoperative or smooth portion of said wheel adjacent to the driver, or an operative or toothed portion adjacent thereto, whereby a rotation of said gear-wheel may be effected; and a retaining strip co-operating with said shaft to prevent the return of the parts from an inoperative axial position to an operative axial position until said starting-arm is again actuated.

35. The combination, with a rotary carrier or turret, and a part mounted thereon which is adapted to have an independent rotary movement about its own axis, of means for shift said part axially; a starting-arm for initiating the said independent rotary movement of the said part; a device for holding the part in its extreme axial positions, comprising a spring-pressed detent-finger, and companion notches or grooves; and means comprising latch mechanisms for initiating the said rotary movement of said part.

36. The combination, with a rotary carrier or turret, and a part mounted thereon which is adapted to have an independent rotary movement about its own axis, of means for shifting said part axially; a starting-arm for initiating the said independent rotary movement of the said part; a device for holding the part in its extreme axial positions, comprising a spring-pressed detent-finger and companion notches or grooves; and a starting-arm and a row of latch mechanisms designed to actuate said starting-arm at different distances from a fixed point.

37. The combination, with a rotary carrier or turret, a plurality of parts mounted thereon which are adapted to have independent rotary movements about their own axes, starting-arms fixed relatively to said parts and arranged in different planes, and latch mechanisms for co-operating with these arms, of means for shifting said parts axially, comprising actuating members moving in unison with said part; and coacting members mounted upon the carrier.

38. The combination, with a rotary carrier or turret, a plurality of parts mounted thereon which are adapted to have independent rotary movements about their own axes, starting-arms fixed relatively to said parts and arranged in different planes, a corresponding number of rows of latch mechanisms, each row designed to co-operate with a particular arm, and the several mechanisms in each row being designed to actuate the arm at different distances from a fixed point, of means for shifting said parts axially, comprising actuating members moving in unison with said part; and coacting members mounted upon the carrier.

39. In a typewriter, the combination, with a rotary carrier or turret, a plurality of parts mounted thereon which are adapted to have independent rotary movements about their own axes, starting-arms fixed relatively to said parts and arranged in different planes, a corresponding number of rows of latch mechanisms, each row designed to co-operate with a particular arm, and the several mechanisms in each row being designed to actuate the arm at different distances from a fixed point, of means for shifting said parts axially, comprising actuating members moving in unison with said part; coacting members mounted upon the carrier; and an inking device located to ink types before impression is made.

40. The combination of a gear block, a plurality of gear teeth mounted in recesses in said block and each provided with a shoulder adapted to contact with a position-determining shoulder on the gear block, a spring encircling the shank of each gear tooth and urging the shoulder on the tooth into contact with the shoulder on the gear block, and threaded plugs engaging with the walls of the recesses in the gear block and constituting abutments for the springs.

41. The combination with a carrier, of a rotatable part mounted thereon and shiftable to and fro in its bearings, means for initiating the rotary movement of said part relatively to the carrier, a cam-faced actuator co-operative with a yieldingly supported co-actor to shift said part longitudinally upon the initiation of the rotary movement of the part, and means brought into action by the longitudinal shifting of said part and operating to continue its rotary movement.

42. The combination with a carrier, of a stud on which the carrier is mounted, a carrier drive shaft, a coupling between the drive shaft and the carrier, a spring interposed between said carrier and said coupling and tending to urge said drive shaft and said carrier in opposite directions, a rotatable part mounted on the carrier and shiftable to and fro in its bearings, means for initiating the rotary movement of said part relatively to the carrier, a cam-faced actuator operative to shift said part longitudinally upon the initiation of the rotary movement of said part, and means brought into action by the longitudinal shifting of said part and operating to continue its rotary movement.

43. The combination with a carrier, of a stud on which the carrier is mounted, a carrier-actuating shaft, a coupling between said shaft and said carrier, a rotatable part mounted on the carrier and shiftable to and fro in its bearings, means for initiating the rotary movement of said part relatively to the carrier, a cam-faced actuator co-operative with a yieldingly supported co-actor to shift said part longitudinally upon the initiation of the rotary movement of the part, and means brought into action by the longitudinal shifting of said part and operating to continue its rotary movement.

44. The combination with a carrier, of a stud on which the carrier is mounted, a carrier-actuating shaft, a coupling between the carrier and the shaft, a spring interposed between said coupling and said carrier and tending to urge the carrier and the shaft in opposite directions, a rotatable part mounted on the carrier and shiftable to and fro in its bearings, means for initiating the rotary movement of said part relatively to the carrier, a cam-faced actuator co-operative with a yieldingly supported co-actor to shift said part longitudinally upon the initiation of the rotary movement of the part, and means brought into action by the longitudinal shifting of said part and operating to continue its rotary movement.

45. The combination with a carrier, of a rotatable part mounted thereon and shiftable to and fro transversely to the plane of its rotation; means for initiating the rotary movement of said part relatively to the carrier; means for shifting said part transversely to its plane of rotation upon the initiation of the rotary movement of the part; and resilient means for receiving the blow of said part when the latter is moved transversely.

46. The combination with a carrier, of a rotatable part mounted thereon and shiftable to and fro transversely to the plane of its rotation; a starting arm for initiating the rotary movement of said part relatively to the carrier; means for shifting said part transversely to its plane of rotation upon the initiation of the rotary movement of the part; resilient means for receiving the blow of said part when the latter is moved transversely; and means co-operative with said part to prevent the return from an inoperative position transversely to its plane of rotation to an operative position until said starting arm is again actuated.

47. The combination with a carrier, of a rotatable part mounted thereon and shiftable to and fro transversely to the plane of its rotation; a starting arm for initiating the rotary movement of said part relatively to the carrier; means for shifting said part transversely to its plane of rotation upon the initiation of the rotary movement of the part; resilient means for receiving the blow of said part when the latter is moved transversely to its plane of rotation; and a device for holding said part in its two extreme positions when shifted transversely.

48. The combination with a carrier, of a rotatable part mounted thereon and shiftable to and fro transversely to the plane of its rotation; a starting arm for initiating the rotary movement of said part, means comprising a cam for shifting said part transversely to its plane of rotation; means actuatable by the transverse shifting of said part and operative to continue its rotary movement; cam means for stopping the rotation of said part; and an elastic buffer associated therewith for preventing overthrow of said cam means.

49. The combination with a revoluble shaft adapted for orbital and rotary movement; a starting arm on the shaft; a segmental gear thereon; a latch interposable in the path of the starting arm; a driver gear for engagement with the said segmental gear, co-operative stopping cams, and an elastic buffer associated therewith.

FRANCIS H. RICHARDS.

Witnesses:
   FRED. J. DOLE,
   C. E. VOSS.